United States Patent [19]

Akiyama et al.

[11] Patent Number: 4,879,087
[45] Date of Patent: Nov. 7, 1989

[54] NUCLEAR POWER PLANT

[75] Inventors: Takao Akiyama; Tetsuo Ito, both of Hitachi; Isao Sumida, Ibaraki, all of Japan

[73] Assignee: Hitachi, Ltd., Tokyo, Japan

[21] Appl. No.: 152,380

[22] Filed: Feb. 4, 1988

[30] Foreign Application Priority Data

Feb. 4, 1987 [JP] Japan .................. 62-22357

[51] Int. Cl.⁴ .............................. G21C 7/36
[52] U.S. Cl. .................... 376/216; 376/372; 376/407
[58] Field of Search ............. 376/215, 216, 407, 372

[56] References Cited

U.S. PATENT DOCUMENTS

| | | | |
|---|---|---|---|
| 3,621,926 | 11/1971 | Townsend | 376/407 |
| 4,033,814 | 7/1977 | Bregeon | 376/407 |
| 4,400,343 | 8/1983 | Izumi | 376/417 |
| 4,421,716 | 12/1983 | Hench | 376/216 |
| 4,440,715 | 4/1984 | Sato | 376/210 |
| 4,440,719 | 4/1984 | Howard | 376/372 |
| 4,699,754 | 10/1987 | French | 376/299 |

FOREIGN PATENT DOCUMENTS 4323117 10/1965 Japan .

Primary Examiner—Donald P. Walsh
Attorney, Agent, or Firm—Antonelli, Terry, Wands

[57] ABSTRACT

Jet pumps and a feed water sparger are disposed in a reactor pressure vessel incorporating a core. A first feed water pipe supplies a portion of feed water to the jet pumps as their driving water. A second feed water pipe connected to the first feed water pipe supplies the remaining portion of the feed water to the feed water sparger. A first feed water heater is disposed in the first feed water pipe downstream of a connecting point of the first feed water pipe and the second feed water pipe. An amount of extracted steam introduced into the first feed water heater is controlled on the basis of a difference in the temperature between feed water flowing through the first feed water pipe and the feed water flowing through the second feed water pipe.

17 Claims, 22 Drawing Sheets

FIG. 15A
SYSTEM OUTPUT REQUEST $Q_L$
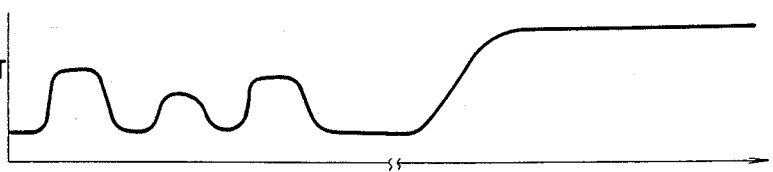
FIG. 15B
TURBIN GENERATOR OUTPUT $Q_T$
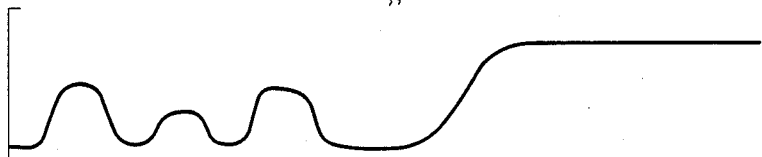
FIG. 15C
AMOUNT OF EXTRACTED TURBINE STEAM $W_{EX}$
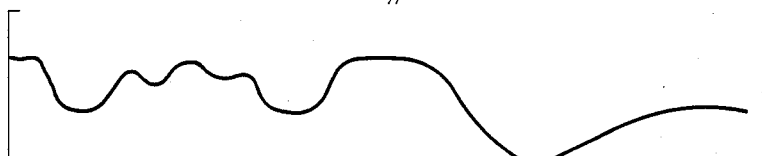
FIG. 15D
REACTOR WATER LEVEL $L_R$
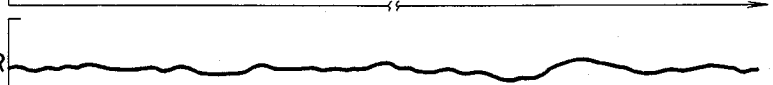
FEED WATER SPARGER FLOW RATE $W_S$
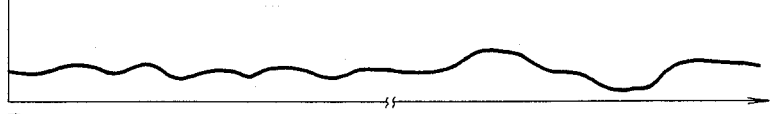
FIG. 15E
JET PUMP DRIVING WATER FLOW RATE $W_J$
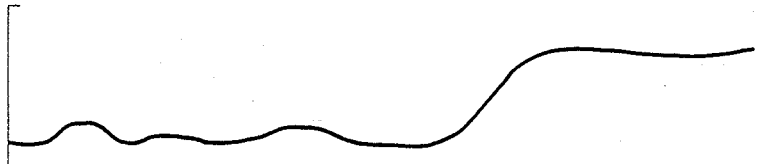
FIG. 15F
FEED WATER TEMPERATURE $T_{FW}$
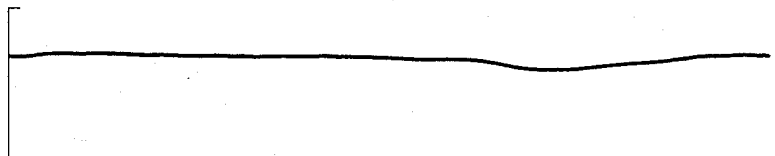
FIG. 15G
NEUTRON FLUX $\phi$
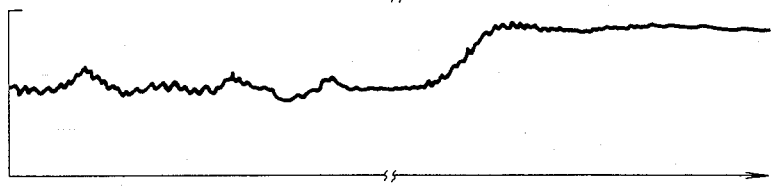
|⎯⎯| 10 SEC.   TIME   |⎯⎯| 3 MIN.

FIG. 19
FIG. 20
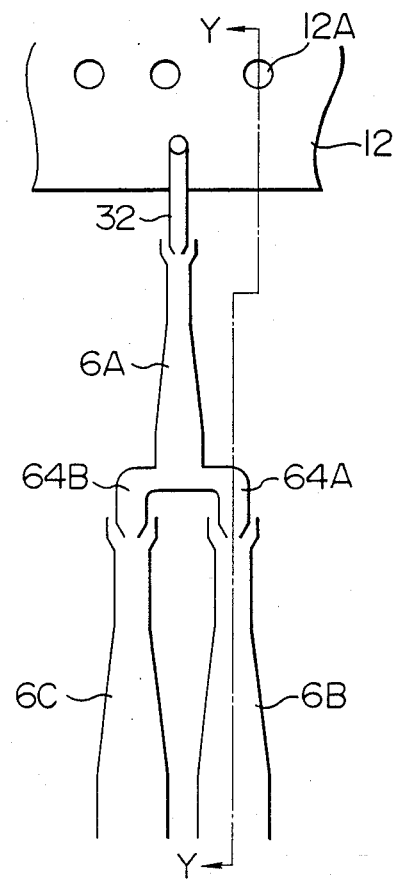
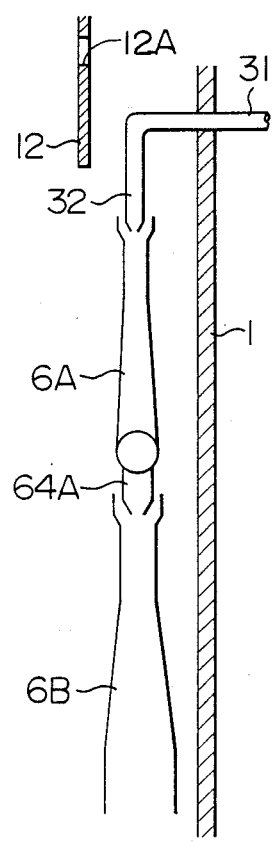

NUCLEAR POWER PLANT

BACKGROUND OF THE INVENTION

1. Field of the Invention

The present invention relates to a nuclear power plant, and more particularly to a nuclear power plant suitably employing a nuclear reactor in which the core flow-rate is controlled by feed water.

2. Statement of the Related Art

At present, reduction in construction expenses is a major task in a nuclear power plant. With respect to a boiling water reactor (hereafter referred to as the BWR power plant), for instance, development is under way of a new type of power plant which is provided with internal pumps. In this new type of power plant, since a recirculation system used in an existing BWR power plant is not required, the overall size of a reactor container becomes compact.

However, it is desirable to make the reactor container even more compact. Examples in which the reactor container can be made compact are disclosed, though not directly referred to therein, in Japanese Patent Examined Publication No. 43-23117 (U.S. patent Ser. No. 497,787; application date: Oct. 19, 1965) and Japanese Patent Examined Publication No. 49-16920 (U.S. Pat. No. 3,621,926).

In a BWR power plant disclosed in Japanese Patent Examined Publication No. 43-23117, a portion of the feed water is supplied to a reactor pressure vessel via a feed water sparger, while the remaining portion of the feed water is used as the driving water for jet pumps so as to supply cooling water to the core. The feed water introduced into the feed water sparger is used for controlling the water level in the reactor pressure vessel. Furthermore, in this BWR power plant, the cooling water discharged from the feed water sparger and the cooling water separated by a steam separator above the core (the two kinds of cooling water are in a mixed state) is cooled by the feed water used as the jet pump driving water, and is subsequently sucked into jet pumps. The cooling of the jet pump suction water by this heat exchanger is aimed at preventing the occurrence of cavitation in the jet pumps due to the boiling of the cooling water in the jet pumps.

Japanese Patent Examined Publication No. 49-16920 discloses a BWR power plant which has jet pumps using as their driving water the cooling water discharged from a recirculation pipe and jet pumps using as their driving water a portion of the feed water, the remaining portion of the feed water being supplied from the feed water sparger into the reactor pressure vessel. In this publication as well, it is disclosed (column 6, lines 37-44) that the cooling water which is sucked from the feed water sparger into the jet pumps through an annular descending flow passage is cooled, as in the case of Japanese Patent Examined Publication No. 43-23117.

Each of the foregoing examples of the prior art is arranged such that a heat exchanger is installed in a reactor pressure vessel, and the cooling water sucked into the jet pumps is cooled by the jet pump driving water, i.e., part of the feed water, by using this heat exchanger. However, the temperature difference between the cooling water sucked into the jet pumps and the jet pump driving water, both being allowed to flow into the heat exchanger, in the order of 5°-60° C., which the flow rate at the side, of the heat exchanger, to be cooled is 10 times as much as the flow rate at cooling side thereof. For this reason, the heat exchange efficiency of the cooling water sucked into the jet pumps and the jet pump driving water is very poor, so that the temperature of the cooling water sucked into the jet pumps does not decline appreciably. Accordingly, in these conventional examples, the range which makes it possible to prevent the occurrence of cavitation in the jet pumps is narrow, so that a reactor output through the core flow-rate control cannot be altered substantially. In particular, it is difficult to effect a load following operation in the conventional examples.

SUMMARY OF THE INVENTION

Accordingly, an object of the present invention is to provide a nuclear power plant which is capable of simplifying the structure of a nuclear reactor.

Another object of the present invention is to provide a nuclear power plant which is capable of preventing the occurrence of cavitation in jet pumps and of substantially altering a reactor power through core flow-rate control.

Still another object of the present invention is to provide a nuclear power plant which is capable of preventing a decline in the water level of a reactor during a trip.

A further object of the present invention is to provide a nuclear power plant which is capable of altering outputs with small amplitude and short cycles.

A characteristic feature of the present invention lies in that there is provided feed water supplying means for introducing a portion of the feed water into jet pumps in a reactor container as driving water and introducing the remaining portion of the feed water into a feed water sparger in the reactor container at a temperature lower than that of the portion of the feed water introduced into the jet pumps.

In accordance with the present invention, since it is not necessary to install in a reactor container a heat exchanger for heating the feed water used as the driving water for the jet pumps, the structure of the reactor can be simplified.

BRIEF DESCRIPTION OF THE DRAWINGS

FIGS. 15A to 15G are respectively is a diagrams of the response characteristics of the BWR power plant based on the operation of the bleeding valve controller shown in FIG. 12;

FIGS. 17 to 19 are schematic diagrams illustrating other embodiments of the present invention;

FIG. 20 is a cross-sectional view taken along the line Y—Y of FIG. 19;

DETAILED DESCRIPTION OF THE PREFERRED EMBODIMENTS

Figure 1:
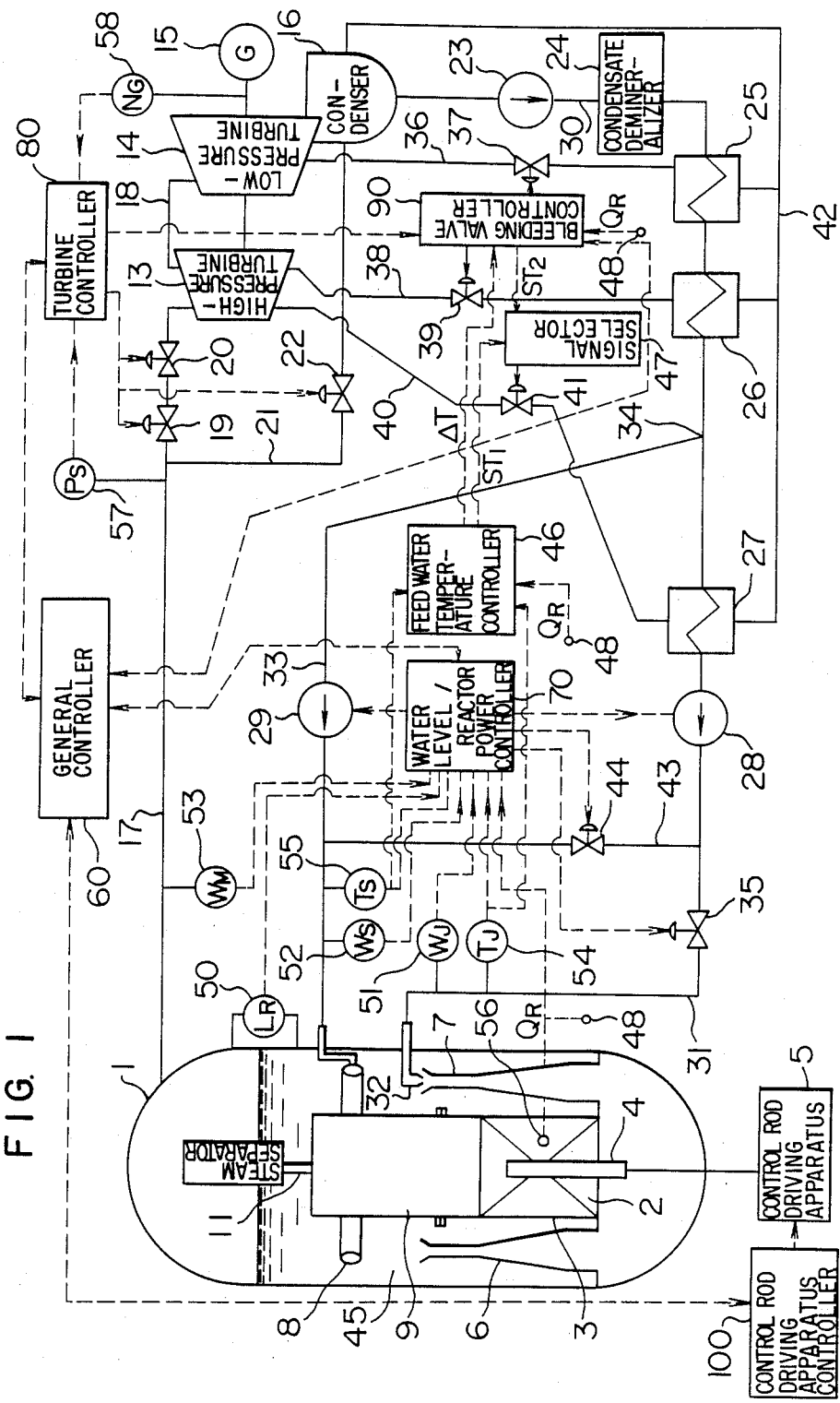
FIG. 1 is a schematic diagram of a preferred embodiment of a BWR power plant in accordance with the present invention.

Referring now to FIG. 1, a description will be given of a BWR power plant in accordance with a preferred embodiment of the present invention.

A reactor core 2 is disposed in a tubular core shroud 3 provided in a reactor pressure vessel 1, and is loaded with a multiplicity of fuel assemblies. A plurality of control rods 4 are inserted into the core 3, and a plurality of control rod driving apparatuses 5 are connected to the respective control rods 4. A plurality of jet pumps 6 having throat portions 7 are disposed in an annular space formed between the reactor pressure vessel 1 and the core shroud 3. The throat portions 7 are located above the core 2. A feed water sparger 8 is disposed above the throat portions 7 in the reactor pressure vessel 1 and has a header and a multiplicity of injection nozzles for injecting feed water. The injection nozzles are disposed in the header and are oriented toward the jet pumps. The feed water sparger 8 is located below the position at which a feed water pipe 33 is installed in the reactor pressure vessel 1. This is to ensure that low-temperature feed water injected from the feed water sparger 8 can be sucked by the jet pumps 6 at as practically low a temperature as possible. A tubular riser portion 9 is installed on the upper end of the core shroud 3. The diameter of the riser portion 9 is the same as that of the core shroud 3. The upper end of the riser portion 9 is located above the installation level of the feed water sparger 8. The feed water sparger 8 is disposed around the riser portion 9. A steam separator 10 is installed above the riser portion 9 via a stand pipe 11.

A description will now be given of the construction of turbines and their peripheral parts. The shafts of a high-pressure turbine 13, a low-pressure turbine 14, and a generator 15 are connected to each other. However, the generator 15 is detachably connected to the low-pressure turbine 14. The high-pressure turbine 13 is connected to the reactor pressure vessel 1 by means of a main steam pipe 17, while the low-pressure turbine 14 is connected to the high-pressure turbine 13 by means of a main steam pipe 18. A condenser 16 is connected to a steam discharge port (not shown) of the low-pressure turbine 14.

A steam stop valve 19 and a steam regulator valve 20 are provided in the main steam pipe 17. One end of a bypass pipe 21 having a bypass valve 22 is connected to the main steam pipe 17 upstream of the steam stop valve 19, while the other end thereof is connected to the condenser 16. A feed water pipe 30 is connected to the condenser 16. A condenser pump 23, a condensate demineralizer 24, a plurality of low-pressure feed water heaters 25, and a plurality of high-pressure feed water heaters 26 are disposed in this feed water pipe 30 in that order from the condenser 16 side toward the reactor pressure container 1 side. The feed water pipe 30 is branched off at a branching point 34 downstream of the high-pressure feed water heaters 26 into a feed water pipe 31 (pipe for jet pump driving water) and the feed water pipe 33 (supply pipe for the feed water sparger). A feed water pump 28, a final-stage high-pressure feed water heater 27, and a shut-off valve 35 are provided consecutively in the feed water pipe 31.

Figure 2:
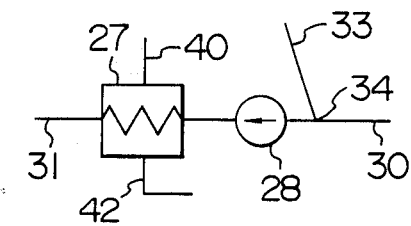
FIG. 2 is a schematic diagram illustrating another example of the arrangement of a water supply pump 28 and a high-pressure feed water heater 27.

In FIG. 1, the feed water pump 28 which is disposed downstream of the branching point 34 and downstream of the high-pressure feed water heater 27 may be disposed upstream of the high-pressure feed water heater 27, as shown in FIG. 2. If the feed water pump 28 is disposed upstream of the high-pressure feed water heater 28, as shown in FIG. 2, the pressure of feed water applied to the suction side of the feed water pump 28 becomes equal with that of feed water applied to the suction side of a feed water pump 29 which will be described later. This is because a pressure loss due to the high-pressure feed water heater 27 is capable of avoiding the effect exerted on the suction side of the feed water pump 28.

The feed water pipe 31 is led to the reactor pressure vessel 1, and a tip thereof is constituted by a nozzle 32 which is open above the throat portion 7. The feed water sparger 8 is located above the nozzle 32. The other feed water pipe 33 is connected to the feed water sparger 8. The feed water pump 29 is disposed in the feed water pipe 33.

The low-pressure feed water heater 25 and the high-pressure heat water heater 26, 27 respectively introduced part of the steam generated in the reactor pressure vessel 1 so as to heat the feed water. In other words, a space inside the shell of the low-pressure feed water heater 25 is communicated with the low-pressure turbine 14 by means of a bleeding pipe 36 having a bleeding valve 37. A space inside the shell of the high-pressure feed water heater 27 is communicated with the high-pressure turbine 13 by means of a bleeding pipe 40. A bleeding valve 39 is provided in the bleeding pipe 38, and a bleeding valve 41 in the bleeding pipe 40. Each of the spaces inside the shells of the low-pressure feed water heater 25 and the high-pressure feed water heaters 26, 27 is communicated with the condenser 16 by means of a drain pipe 42. Further, the feed water pipes 31, 33 are communicated with each other by means of a bypass pipe 43 which is provided with a shut-off valve 44. One end of the bypass pipe 43 is connected to the feed water pipe 33 downstream of the feed water pump 29, while the other end thereof is connected to the feed water pipe 31 between the feed water pump 28 and the shut-off valve 35.

Incidentally, the following are installed as detectors: a level gauge 50 for detecting the reactor water level $L_R$ in the reactor pressure vessel 1; a flow meter 51 for detecting a flow rate of feed water (a flow rate of jet pump driving water, $W_J$), which constitutes driving water for the jet pump 6; a flow meter 52 for detecting a flow rate of feed water (a flow rate of the feed water sparger, $W_S$) in the feed water pipe 33 which is supplied from the feed water sparger 8 to the reactor pressure vessel 1; and a flow meter 53 for detecting a flow rate of main steam ($W_M$) flowing through the main steam pipe 17. The level gauge 50 is installed in the reactor pressure vessel 1, the flow meter 51 in the feed water pipe 31, the flow meter 52 in the feed water pipe 33, and the flow meter 53 in the main steam pipe 17. Further installed are a thermometer 54 installed in the feed water pipe 31 and adapted to detect a temperature ($T_J$) of feed water (jet pump driving water); a thermometer 55 installed in the feed water pipe 33 and adapted to detect a temperature ($T_S$) of feed water (water in the feed water sparger); an output detector 56 installed in the core 2 and adapted to detect a reactor output ($Q_R$); a pressure gauge 57 installed in the main steam pipe 17 and for detecting the main steam pressure (PS); and a tachometer 58 for detecting the number of revolutions of the turbine ($N_G$).

Each of the amounts of status detected by the level gauge 50, flow meters 51, 52, and 53, thermometers 54, 55, and reactor power detector 56 are transmitted to the water level/reactor power controller 70, which controls the feed water pumps 28, 29 and shut-off valves 35, 44. Each of the amounts of status detected by the pressure gauge 57 and the tachometer 58 is transmitted to the turbine controller 80, which controls the steam stop valve 19, steam regulator valve 20, and bypass valve 22. Installed as other controllers are the feed water temperature controller 46 for controlling an amount of opening of the bleeding valve 41 on the basis of output signals of the temperature gauges 54, 55, a bleeding valve controller 90 for controlling the amounts of opening of the bleeding valves 37, 39 on the basis of output signals of the turbine controller 80, and a control rod driving apparatus controller 100 for controlling the control rod driving apparatuses 5. Of signals output from the feed water temperature controller 46 and the bleeding valve controller 90, a signal selector 47 preferentially transmits the former output signal to the bleeding valve 41. Furthermore, the general controller 60 effects the general control of the water level/reactor power controller 70, turbine controller 80, bleeding valve controller 90, and control rod driving apparatus controller 100.

The operation of the BWR power plant having the above-described arrangement in accordance with this embodiment will be described below.

The control of reactor power in this embodiment is effected by adjusting the insertion of the control rods 4 into the core and removal thereof as well as a core flow rate (a flow rate of cooling water fed to the core 2).

Steam generated in the core 2 rises in the riser portions 9 and is introduced into the steam separator 10, which separates cooling water contained in the steam. The separated cooling water flows downwardly toward an annular descending flow passage 45 formed between the riser portions 9 and the reactor pressure vessel 1. Meanwhile, the steam in which cooling water is removed by the steam separator 10 is introduced into the high-pressure turbine 13 through the main steam pipe 17 and further into the low-pressure turbine 14 through the main steam pipe 18. During the normal operation of the plant, the steam stop valve 19 and the steam regulator valve 20 are open, while the bypass valve 22 is closed. The steam rotates the high and low-pressure turbines 13, 14. Also, the generator 15 which is connected to these turbines is rotated simultaneously. The steam exhausted from the low-pressure turbine 14 into the condenser 16 is condensed into water in the condenser 16. This condensed water is supplied again to the reactor pressure vessel 1 as feed water through the feed water pipes 30, 31, and 33. Namely, the pressure of the condensed water, i.e., feed water, in the condenser 16 is increased, and after it is purified by the condensate demineralizer 24, the feed water reaches the branching point 34 through respective heat conductive pipes of the low-pressure feed water heaters 25, 26. The steam respectively extracted from the low- and high-pressure turbines 14, 13 by the bleeding pipes 36, 38 is supplied to spaces inside the shells of the low- and high-pressure feed water heaters 25, 26. The flow rates of the extracted steam are controlled by the bleeding waves 37, 39. The feed water introduced into the heat conductive pipes of the feed water heaters 25, 26 is heated by the extracted steam supplied to the spaces inside the shells, and its temperature is raised as a result. The extracted steam is condensed in the spaces inside the shells upper heating of the feed water, and is thereby converted into a drain. This drain is returned to the condenser 16 by a drain pipe 42.

Some portion of the feed water which has reached the branching point 34 passes through the feed water pipe 33 and its pressure is increased by the feed water pump 29. This feed water is then discharged from the feed water sparger 8 into the annular descending flow passage 45 in the reactor pressure vessel 1. The cooling water discharged from the feed water sparger 8 also contributes to the adjustment of the water level inside the reactor pressure vessel 1, as will be described later.

On the other hand, the pressure of the remaining portion of the feed water which has reached the branching point 34 is increased by the feed water pump 28, and its temperature is increased after it is introduced into the heat conductive pipe inside the high-pressure feed water heater 27. This feed water is then discharged from the nozzles 32 into the jet pump 6. As this feed water is discharged from the nozzle 32 into the jet pumps 6, the cooling water remaining in the annular descending flow channel 45 is sucked into the jet pumps 6. The high-pressure steam extracted from the high-pressure turbine 13 by the bleeding pipe 40 is supplied to the space inside the shell of the high-pressure feed water heater 27. The bleeding pipe 40 extracts steam from the high-pressure turbine 13 at an upstream position as compared to that at which the bleeding pipe 38 does so. Accordingly, the temperature of the steam extracted by the bleeding pipe 40 is higher than that of the steam extracted by the bleeding pipe 38. The extracted steam introduced into the space inside the shell of the high-pressure feed water heater 27 heats the feed water flowing in the conductive pipe and is condensed into a drain. This drain is also introduced into the condenser 16 through the drain pipe 42.

The feed water flowing through the feed water pipe 31 contributes as the driving water for the jet pump 6. The feed water discharged from the nozzle 32 as well as the cooling water in the annular descending flow passage 45 which is sucked into the jet pumps 6 are discharged from the jet pumps 6 in a mixed state. The cooling water discharged from the jet pumps 6 is introduced into the core 2 from therebelow.

The embodiment described above effects (I) the use of two different kinds of feed water having different temperatures, (II) the control of the core flow rate (the control of outputs with finer adjustment than that of the control rods) and the control of the water level by means of the feed water, (III) the control of protection at the time of an emergency, and (IV) the control of response characteristics of generator outputs. A detailed description will be given hereafter of these items in sequence.

(I) Use of Two Different Kinds of Feed Water Having Different Temperatures

Figure 3:
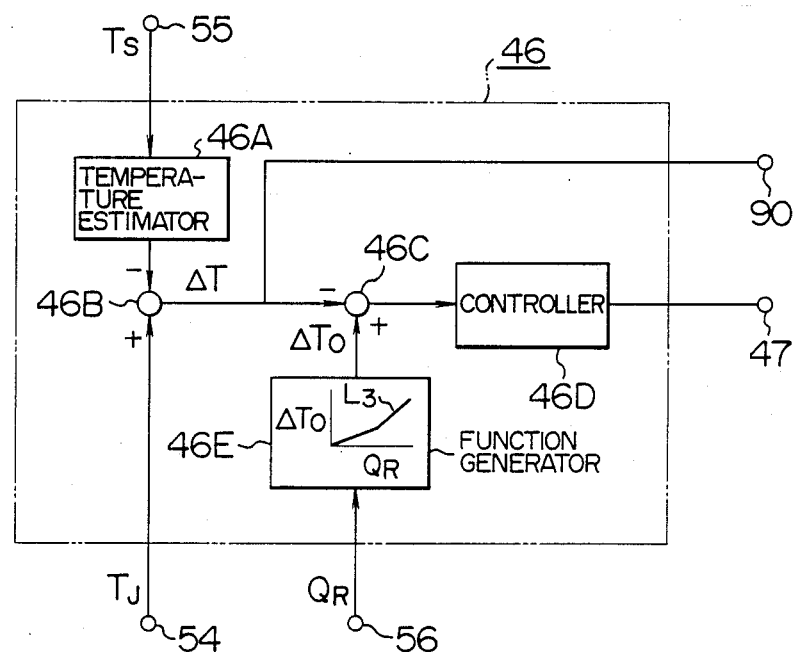
FIG. 3 is a schematic diagram of a feed water temperature controller shown in FIG. 1.
Figure 14:
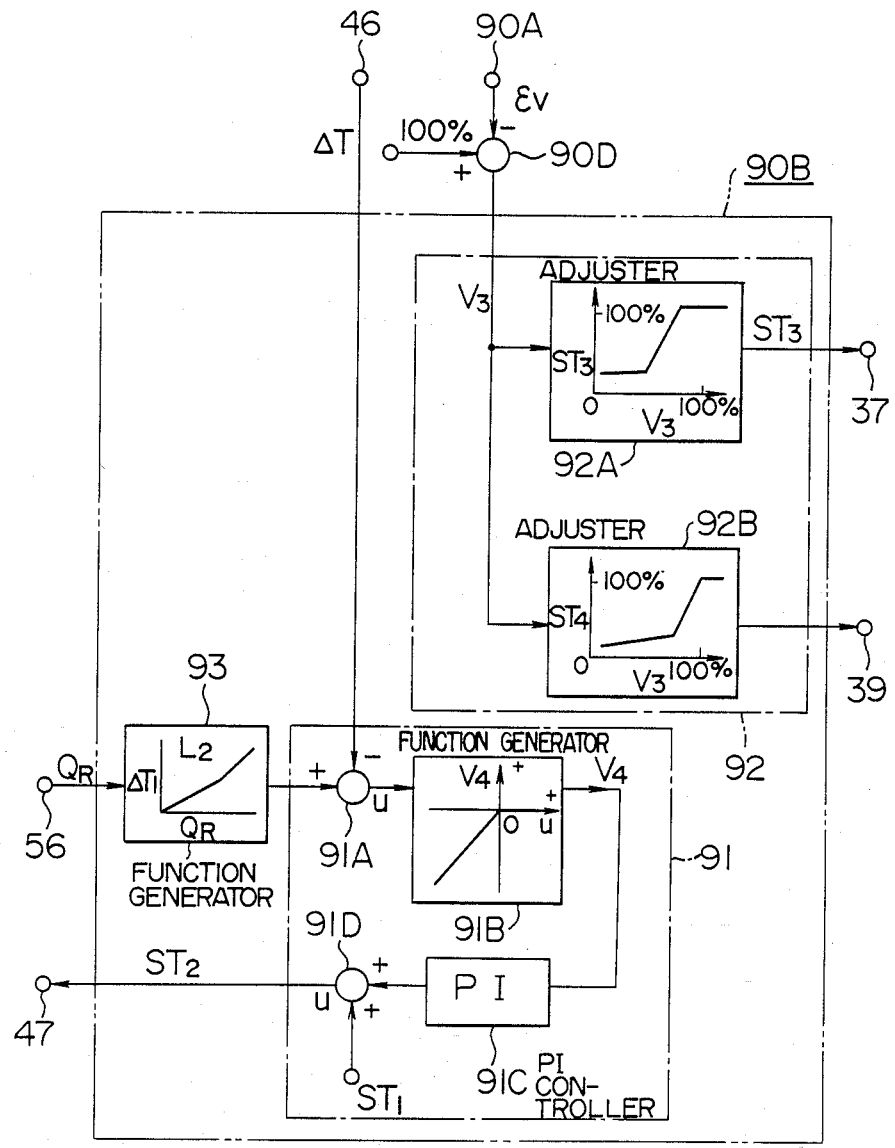
FIG. 14 is a schematic diagram of a bleeding amount distributor shown in FIG. 12.

In this embodiment, a portion of the feed water branched upstream of the high-pressure feed water heater 27 is supplied from the feed water sparger 8 into the reactor pressure vessel 1 without passing through the high-pressure feed water heater 27, while the remaining portion of the feed water is supplied into the reactor pressure vessel 1 (specifically into the jet pumps 6) through the high-pressure feed water heater 27. Accordingly, the temperature of the feed water sparger 8 is lower than that of the feed water supplied from the feed water pipe 31 into the jet pumps 6 as the driving water by a portion which is not heated by the high-pressure feed water heater 27. To put is conversely, the temperature of the feed water which is used as the driving water for the jet pump 6 is higher than that of the feed water supplied to the feed water sparger 8 by a portion which is heated by the high-pressure feed water heater 27. The temperature difference between these two kinds of feed water is adjusted to a predetermined value through the control of the amount of opening of the bleeding valve 41 by the feed water temperature controller 46. As shown in FIG. 3, the feed water temperature controller 46 has a temperature estimator 46A, adders 46B, 46C, a controller 46D, and a function generator 46E. The temperature estimator 46A is used to determined a temperature $T_{JSC}$ of a suction current 45A (FIG. 45A) sucked into the jet pumps 6 on the basis of the temperature $T_S$ of the feed water inside the feed water pipe 33 (hereafter referred to as the feed water sparger water) measured by the thermometer 55. A difference $\Delta T$ between the temperature $T_{JSC}$ and the temperature $T_J$ of the feed water inside the feed water pipe 31 (hereafter referred to as the jet pump driving water) measured by the thermometer 54 is determined by the adder 46B. The function generator 46E stores the characteristics $L_3$ of a relation between a reactor power $Q_R$ and a set temperature difference $\Delta T_0$. The set temperature difference $\Delta T_0$ is determined in correspondence with the reactor power $Q_R$. The characteristics $L_3$ are located below an alarm issuing line $L_2$ shown in FIG. 10, which will be described below, and are set in such a manner that the temperature difference between the jet pump driving water and the feed water sparger water assumes a necessary value. The function generator 46E outputs the set temperature difference $\Delta T_0$ corresponding to the reactor power $Q_R$ measured by the reactor power detector 56. The set temperature difference $\Delta T_0$ output from the function generator 46E as well as the temperature difference $\Delta T$ output from the adder 46B are input to the adder 46C. The adder 46C determines a deviation $T_X$ between the set temperature difference $\Delta T_0$ and the temperature difference $\Delta T$. The controller 46D outputs an opening-amount signal $ST_1$ for the bleeding valve 41 on the basis of the deviation $T_X$. The opening-amount signal $ST_1$ is transmitted to the signal selector 47, which transmits the opening-amount signal $ST_1$ in preference to an opening-amount signal $ST_2$, i.e., an output of the bleeding valve controller 90. When the opening-amount signal $ST_2$ is not output or delivered, i.e., when the opening-amount signal $ST_2$ is a signal which corresponds to a signal $V_2$ whose level is 0, as will be described below, the opening-amount signal $ST_1$ is selected and transmitted to the bleeding valve 41. In short, in cases other than when a bleeding valve opening controller 91 (FIG. 14) of the bleeding valve controller 90 operates (i.e., when a deviation signal U, which is an output of an adder 91A shown in FIG. 14, is negative), the amount of opening of the bleeding valve 41 is adjusted by the opening-amount signal $ST_1$ which is the output of the feed water temperature controller 46.

Thus, since the feed water sparger water having a temperature lower than that of the jet pump driving water discharged from the nozzle 32 by a predetermined temperature difference is supplied from the feed water sparger 8 into the reactor pressure vessel 1, the temperature of the cooling water descending through the annular descending flow passage 45 declines, and, hence, low-temperature cooling water is sucked into the jet pumps 6 by means of the feed water injected from the nozzle 32. As a result, it is possible to prevent the occurrence of cavitation in the jet pumps 6. The aforementioned temperature difference between the two kinds of feed water is controlled in such as manner as to satisfy a predetermined value during normal operation. However, it does not mean that the temperature of the feed water flowing through the feed water pipe 31 can be increased noticeably insofar as the temperature difference between the two kinds of feed water satisfies the predetermined value. An important matter in this respect is that the temperature of the feed water inside the feed water pipe 31 is determined on the basis of the enthalpy of the cooling water at a core inlet which is required in the light of the core characteristics and in consideration of the enthalpy of the cooling water separated by the steam separator 10 and flowing downwardly through the annular descending flow passage 45 and the enthalpy of the feed water in the feed water pipes 31, 33. The thus-determined feed water temperature in the feed water pipe 31 is adjusted when the amount of opening of the bleeding valve 41 is controlled in such a manner that the temperature of this feed water becomes higher than that of the feed water in the feed water pipe 33 by a predetermined value.

As has been described above, in accordance with this embodiment, since the feed water flowing through the feed water pipes 31, 33 is provided with a temperature difference (the temperature of the feed water in the feed water pipe 33 being lower), it is unnecessary to provide a heat exchanger inside the reactor pressure vessel 1 as has been required in the case of a conventional example, so that the internal structure of the reactor pressure vessel 1 can be simplified remarkably. Accordingly, the work concerning installation of in-reactor structures in the reactor pressure vessel 1 can be facilitated appreciably. Furthermore, it is possible to dispense with maintenance work concerning the heat exchanger inside the reactor pressure vessel 1 radioactivated to a high level, which has been necessary in the conventional example. In addition, since, in this embodiment, the high-pressure feed water heater 27, which is disposed outside the reactor pressure vessel 1 and is necessary for heating the feed water in the conventional example as well, is heated or unheated, it is possible to enlarge the temperature difference between the feed water in the feed water pipe 31 and that in the feed water pipe 33. Hence, it is possible to remarkably lower than temperature of the cooling water sucked into the jet pumps (i.e., the cooling water inside the annular descending flow passage 45) than that of the conventional example.

Accordingly, in this embodiment, the extent to which the occurrence of cavitation in the jet pumps 6 can be prevented increases substantially, so that it is possible to substantially alter the reactor power by the control of the core flow rate. In this embodiment, therefore, it is readily possible to implement the load following operation, so that it is possible to effect the load following operation to a remarkable degree by the control of the core flow rate. Incidentally, the temperature difference between the jet pump driving water and the cooling water in the annular descending flow passage is very small in the conventional example. Consequently, the cooling effect due to the cooling water in the annular descending flow passage obtained by the jet pump driving water using the heat exchanger installed in the reactor pressure vessel is small, and a temperature drop of the cooling water sucked into the jet pumps is also small. In the conventional example, therefore, the extent to which the occurrence of the jet pump cavitation can be prevented is narrower than in this embodiment, so that it is impossible to cope with the occurrence of cavitation during a substantial change in the reactor power. Furthermore, since the feed water pipe 33 is branched upstream of the high-pressure feed water heater 27, which is an important apparatus for the feedwater system, a cooling apparatus is not required for setting the temperature of the feed water inside the feed water pipe 33 lower than that of the feed water inside the feed water pipe 31. In addition, it is unnecessary to install a new heater for heating the feed water in the feed water pipe 31. In this embodiment, it is unnecessary to install a recirculation system with a recirculation system pipe conventionally disposed in a reactor container surrounding the reactor pressure vessel 1 or an internal pump having a complicated structure. In addition, the feed pumps 28, 29 are disposed outside the reactor container. Therefore, the reactor container can be made compact, and the structure of the interior of the reactor container can be simplified. Since the recirculation system and the internal pump become unnecessary and the maintenance thereof becomes unnecessary, a period of maintenance of the nuclear plant can be shortened.

Although, in this embodiment, the feed water pipe is branched upstream of the final-stage high-pressure feed water heater 27, with respect to a BWR power plant having a different value of the rated output, the feed water pipe 33 may be branched off from the feed water pipe 30 upstream of the feed water heater two or three stages upstream of the final-stage high-pressure feed water heater 27. As a result, it is possible to remarkably lower the temperature of the feed water in the feed water pipe 33 below that of the feed water in the feed water pipe 31 as compared with the above-described embodiment.

The usage of two different kinds of feed water having different temperatures in this embodiment has been conceived as a result of a study which is described below.

In accordance with the conventional core nuclear design, a core flow rate $W_C$ at which the cooling water is supplied through the recirculation system is equivalent to about seven times as large as a total feed-water flow rate $W_{FW}$ (which is equivalent to a main steam flow rate $W_{MS}$ during normal operation). Accordingly, if the conventional core design is used as reference, even if the total feed water is alloted to the jet pumps 6 as the driving water, the jet pumps would require an M ratio of about 6.0, the M ratio being determined by the following formula:

$$M = \frac{\text{Flow rate for suction by the jet pumps}}{\text{Flow rate for driving the jet pumps}}$$

Actually, however, it is necessary to divert a portion of the flow rate of the total feed water to the feed water sparger 8 at the branching point 34 so as to control the water level of the reactor. This is because it is necessary to control the water level of the reactor independently of other variables. Let us assume that one third of the total quantity of feed water is alloted to the feed water sparger 8 and the remaining two thirds to the jet pumps 6. If the flow rate of the feed water sparger water is $W_S$ and the flow rate of the jet pump driving water is $W_J$, and if the core nuclear design is the same, the following formula holds:

$$W_C = 7 W_{FW}$$
$$= (M + 1) \cdot \frac{2}{3} W_{FW}$$

Accordingly, an M ratio required becomes 9.5. Incidentally, the M ratio of conventional BWR jet pumps having a recirculation system is 2.5 or thereabout at the time of a rated output.

Basically, the following four measures are conceivable to increase the M ratio:

(1) The pressure of the driving water for the jet pumps is increased, and the flow rate of the driving water flowing through the throat portions of the jet pumps is also increased.

(2) The required delivery pressure of the jet pumps is made small.

(3) The temperature of a suction flow sucked by the jet pumps is decreased.

(4) Multi-stage jet pumps are used.

Figure 4:
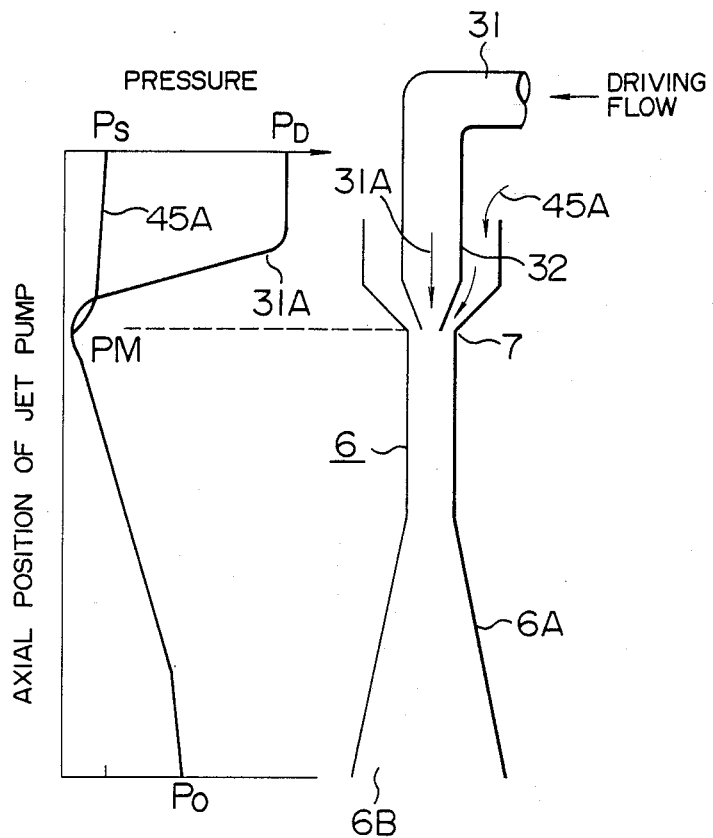
FIG. 4 is a characteristic diagram illustrating the distribution of axial pressure of a jet pump.

The characteristics of a jet pump will now be shown with reference to FIG. 4.

The suction flow 45A (the flow of cooling water through the annular descending flow passage 45) is sucked into the throat portion 7 by virtue of the flow 31A of the jet pump driving water, and after the flows are mixed, the mixture is introduced into an outlet 6B of the jet pump 6 via a diffuser 6A of the jet pump 6. FIG. 4 further shows changes in the pressure $P_S$ of the suction flow 45A and a pressure $P_D$ of the flow of the jet pump driving water that take place in the direction of the flow. The pressure of the two flows assumes a minimum pressure $P_M$ at the throat portion, and the pressure of the flow subsequently increases due to the effect of the diffuser 6A, and a delivery pressure $P_O$ is obtained at the outlet 6B. If the above-described measure (1) is adopted and the driving water flow 31A with an appreciably large pressure $P_D$, namely, with an appreciably high flow rate is used, the pressure of the suction flow 45A becomes lower than a saturation pressure at the throat portion 7 (this phenomenon being called cavitation). When cavitation takes place, the efficiency of the jet pump 6 is remarkably deteriorated, possibly causing damage to the equipment. Accordingly, it is essential to enlarge the M ratio while ensuring that the cavitation will not occur.

One method of increasing the M ratio without the occurrence of the cavitation in the jet pump is to sufficiently lower the temperature of the suction flow 45 and to cause the same not to boil at the pressure $P_M$ since the occurrence of the cavitation is attributable to the boiling which takes place due to the fact that the pressure $P_M$ of the throat portion 7 is lower than the saturation pressure of the suction flow 45A. In other words, this involves the adoption of the above-described method (3). A conventional example based on this idea is disclosed in the aforementioned Japanese Patent Examined Publication No. 43-23117 entitled "Reactor System". As a means of lowering the temperature of the suction flow in this conventional example, a group of heat conductive pipes of the heat exchanger are connected to the feed water pipe 31, shown in FIG. 4, in the reactor pressure vessel 1, and heat exchange is effected between the suction flow and the jet pump driving water which is supplied by this feed water pipe. In this conventional example, the temperature difference between the suction flow and the jet pump driving water is very small, and since a sufficient length and size cannot be provided for the heat exchanger, there has been problems in practical use. Incidentally, this conventional example employs the above-described measure (4) as well.

Accordingly, upon examining various practical measures, the present inventors reached a conclusion that it suffices if the temperature of the feed water supplied from the fed water sparger 8 is lowered sufficiently below that of the feed water used as the jet pump driving water.

It should be noted that, in this embodiment, the above-described measure (2) is also adopted wherein the delivery pressure $P_O$ of the jet pump 6 is made small. It is necessary to make the delivery pressure $P_O$ greater than a pressure loss (static pressure plus dynamic pressure) based primarily on the core 2, a core outlet chamber (plenum), the steam separator 10, and the stand pipe 11. For this reason, a chamber in which a core outlet chamber is elongated upwardly of the core 2 (a chamber which is elongated up to the vicinity of the feed water sparger 8), i.e., the riser portion 9, is provided. The riser is also called a chimney. As a result, a large quantity of the two-phase current exists above the core 2, and a natural circulating force based on the buoyancy of void increases. Since the cooling water is driven by this natural circulating force, it is possible to reduce the delivery necessary pressure for the jet pump 6 as compared with a case where the riser portion 9 is not provided. The delivery pressure shown in FIG. 4 is determined by the magnitude of the pressure $P_O$ of the flow 31A of the jet pump driving water. If the delivery pressure $P_O$ is sufficiently small, it is possible to obtain a large M ratio even if the jet pump 6 is not driven by the jet pump driving water having a very large pressure $P_O$.

(II) Control of the Core Flow Rate and Water Level Control by Feed Water

Figure 5:
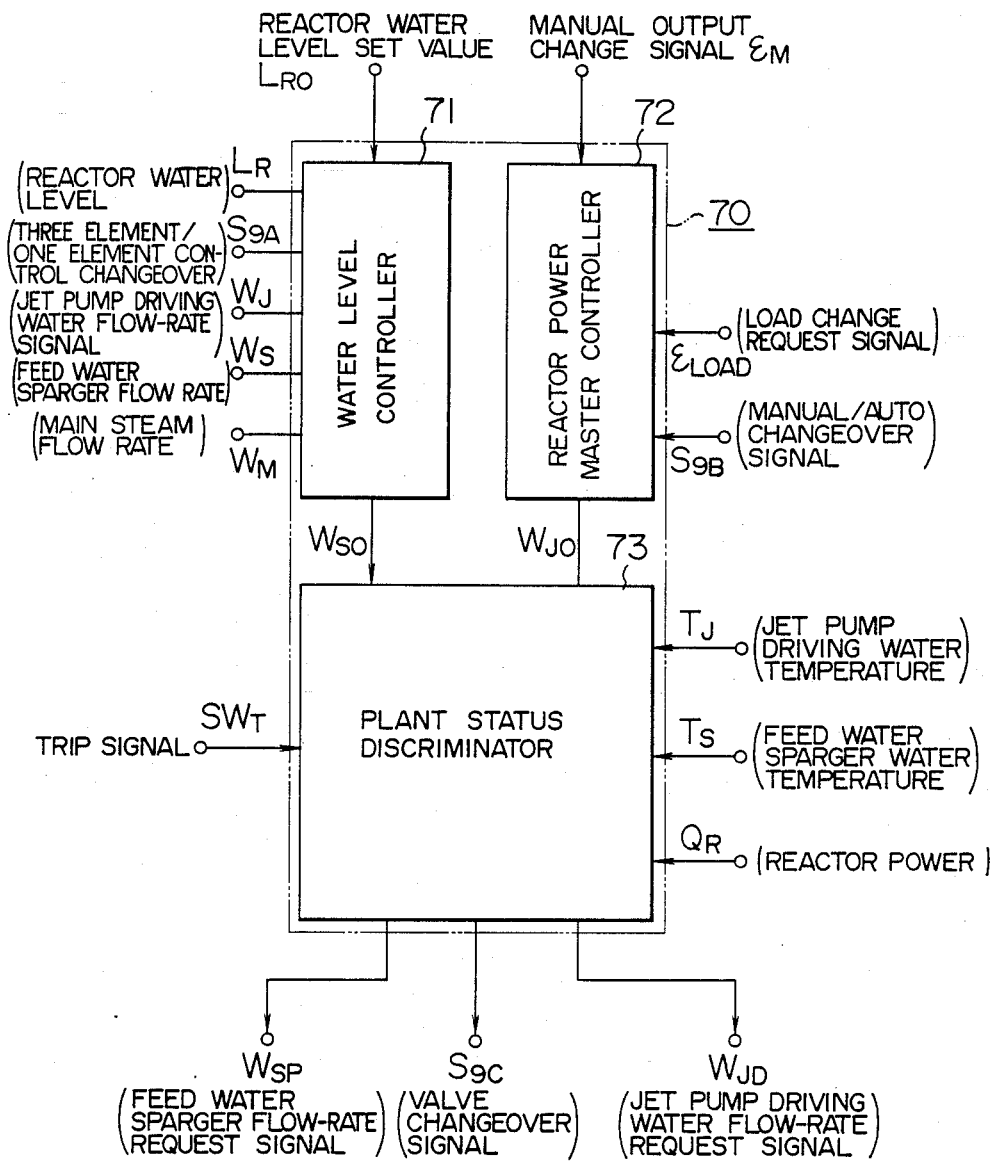
FIG. 5 is a detailed schematic diagram of a water level/output controller shown in FIG. 1.

The control of the core flow rate and the water level in this embodiment is effected by the water level/reactor power controller 70. As shown in FIG. 5, the water level/reactor power controller 70 comprises a water level controller 71, a reactor power master controller 72, and a plant status discriminator 73.

Figure 6:
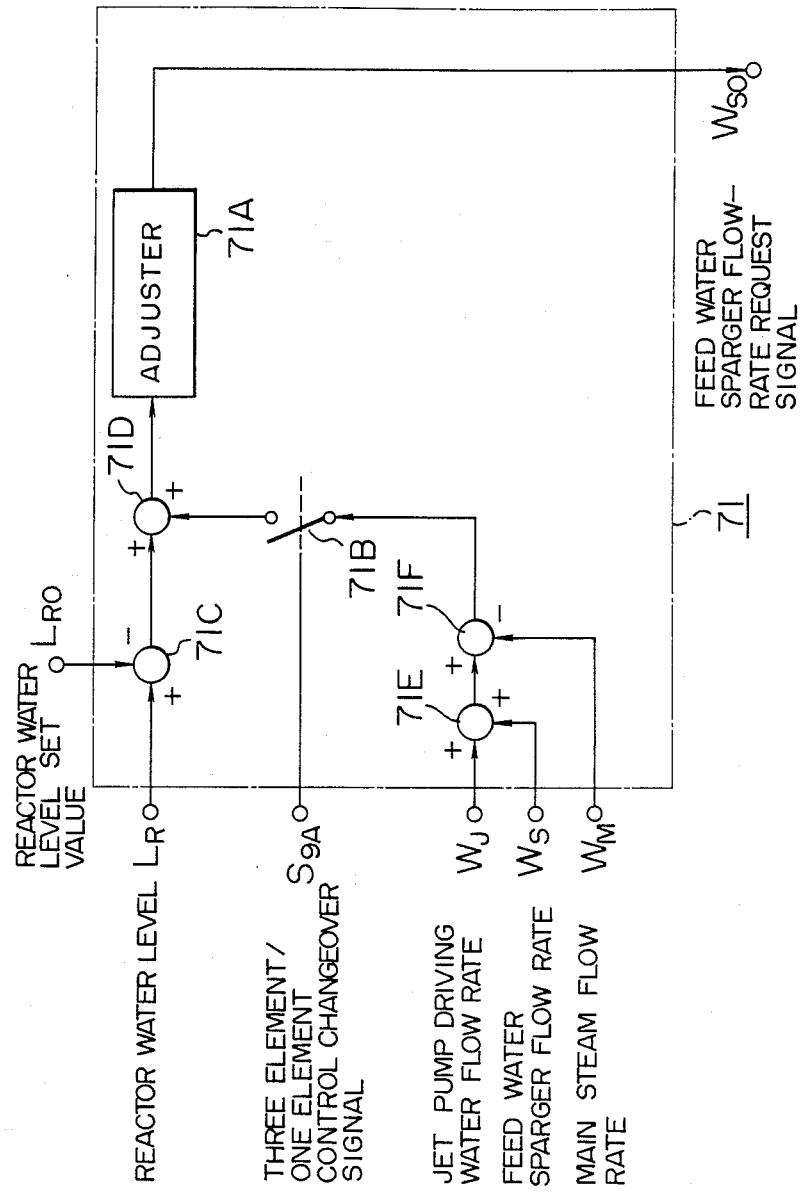
FIG. 6 is a detailed schematic diagram of a water level controller shown in FIG. 5.

The arrangement of the water level controller 71 is shown in FIG. 6. The water level controller 71 has an adjuster 71A, a switch 71B, and adders 71C, 71D, 71E, and 71F. Input to the water level controller 71 are the reactor water level $L_R$ measured by the level gauge 50, the flow rate $W_J$ of the jet pump driving water measured by the flow meter 51, the flow rate $W_S$ of the feed water sparger water measured by the flow meter 52, the main steam flow rate $W_M$ measured by the flow meter 53, and a three element/one element control changeover signal $S_{9A}$ output from the general controller 60. The switch 71B is closed when the three element/one element control changeover signal $S_{9A}$ instructs three element control, while the switch 71B is opened when the signal $S_{9A}$ instructs one element control. The three element/one element control changeover signal $S_{9A}$ instructs one element control until the turbines 13, 14 reach the reactor power (an approx. 10% power).

The adder 71C determines a deviation between the input reactor water level $L_R$ and a set value $L_{RO}$ of the reactor water level. The adder 71E adds the flow rate $W_J$ of the jet pump driving water and the flow rate $W_S$ of the feed water sparger water. The adder 71F determines a deviation between an output signal of the adder 71E and the main steam flow rate $W_M$. When the switch 71 is closed on the basis of the three element/one element control changeover signal $S_{9A}$ (instructing the control of three elements), a deviation signal output from the adder 71F is input to the adder 71D. When the switch 71B is open on the basis of the three element/one element control changeover signal $S_{9A}$ (instructing the control of one element), the deviation signal output from the adder 71F is no input to the adder 71D. The adder 71D inputs the signals output from the adders 71C, 71F when the switch 71B is closed (when the reactor power exceeds 10%), and adds the respective signals. When the switch 71B is open (i.e., when the reactor power is below 10%), the adder 71D outputs the output signal of the adder 71C as it is. The adjuster 71A outputs a feed-water sparger flow-rate request signal $W_{SO}$ in response to the output signal of the adder 71D such that the reactor water level becomes the set value $L_{RO}$ of the reactor water level. This feed-water sparger flow-rate request signal $W_{SO}$ becomes the output of the water level controller 71 and is input to the plant status discriminator 73.

Figure 7:
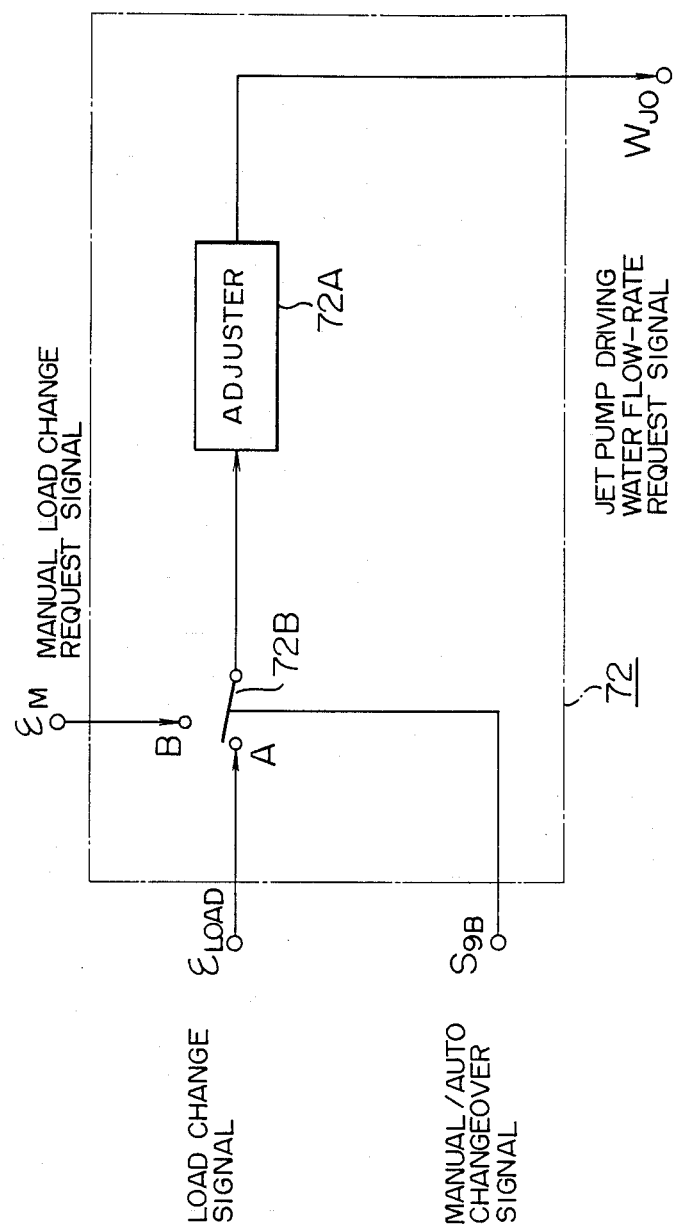
FIG. 7 is a detailed schematic diagram of a reactor output master controller shown in FIG. 5.

The reactor power master controller 72 has the arrangement shown in FIG. 7. In other words, the reactor power master controller 72 has a switch 72B which switches over the adjuster 72A to a fixed terminal A or B. Input to the reactor power master controller 72 are a load change request signal $\epsilon_{LOAD}$, a manual load change request signal $\epsilon_M$, and a manual/automatic changeover signal $S_{9B}$ which are output from the general controller 60.

These load request signals represent a difference between an actual reactor power and a targeted reactor power (or a difference between an actual output of electricity of the generator 15 and a targeted output of electricity). The load change request signal $\epsilon_{LOAD}$ is input to the fixed terminal A. The manual load change request signal $\epsilon_M$ is input to the fixed terminal B. The switch 72B is connected to the fixed terminal B when the manual/automatic changeover signal $S_{9B}$ instructs manual. The load change request signal $\epsilon_{LOAD}$ or $\epsilon_M$ is input to the adjuster 72A, a jet pump driving water flow-rate request signal $W_{JO}$ is output in such a manner that both load change request signals become zero. This request signal $W_{JO}$ is input to the plant status discriminator 73.

Figure 8:
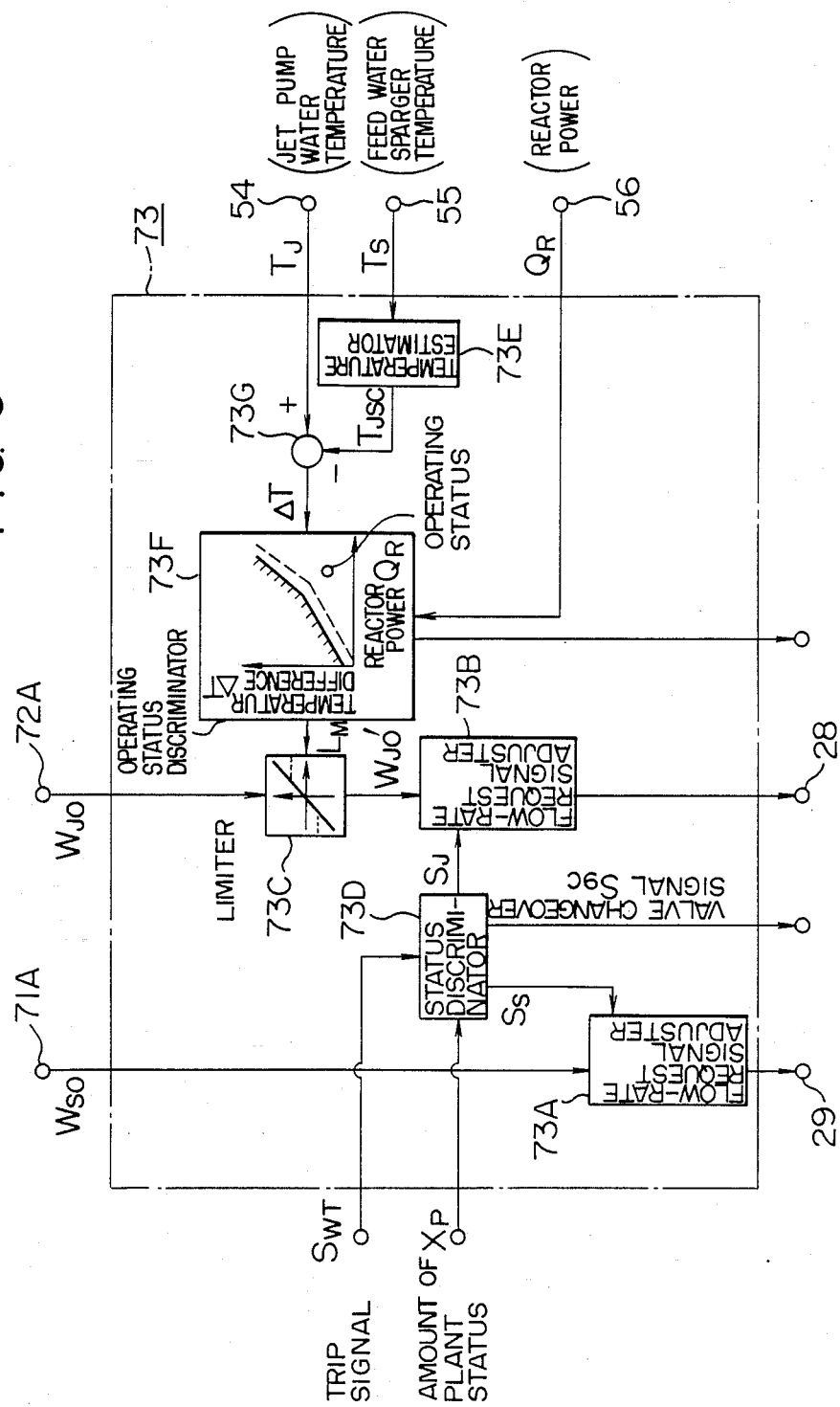
FIG. 8 is a detailed schematic diagram of a plant status discriminator shown in FIG. 5.

When the BWR power plant is operating normally, the plant status discriminator 73 shown in FIG. 8 outputs both values of the input feed water sparger flow-rate request signal $W_{SO}$ and the jet pump driving water flow-rate request signal $W_{JO}$ as they are as the feed water sparger flow-rate request signal $W_{SP}$ and the jet pump driving water flow-rate request signal $W_{JD}$. The detailed arrangement and functions of the plant status discriminator 73 will be described in the ensuring item (III).

The feed water sparger flow-rate request signal $W_{SP}$ is input to the feed water pump 29. The feed water pump 29 changes the number of revolutions in correspondence with the feed water sparger flow-rate request signal $W_{SP}$ and thereby adjusts the flow rate of the feed water flowing through the feed water pipe 33 such that the reactor water level $L_R$ becomes the set value $L_R$ of the reactor water level. As a result, it is possible to maintain the reactor water level $L_R$ at a predetermined level regardless of the reactor output.

The jet pump driving water flow-rate request signal $W_J$ is input to the feed water pump 28. The feed water pump 28 changes the number of revolutions in correspondence with the jet pump driving water flow-rate request signal $W_{JD}$, and adjusts the flow rate of the feed water flowing through the feed water pipe 31 such that the reactor power $Q_R$ becomes a predetermined reactor power. The control of the flow rate of the feed water in the feed water pipe 31 subjects the reactor flow of the cooling water discharged from the jet pump in the same way as a conventional recirculating system having a recirculating pipe, thereby leading to the control of the reactor power. The fine control of the reactor power based on a change in the core flow rate due to the feed water in the feed water pipe 31 in this embodiment is effected in a reactor power control area (a high reactor power area exceeding a reactor power for starting a Pellet) Clad Mechanical Interaction (PCMI) disclosed in the specification of Japanese Patent Examined Publication No. 57-11038. The output control in an area below the output for starting the PCMI is effected by the control rods 4 in the same way as described in said Japanese Patent Examined Publication No. 57-11038.

Figure 9:
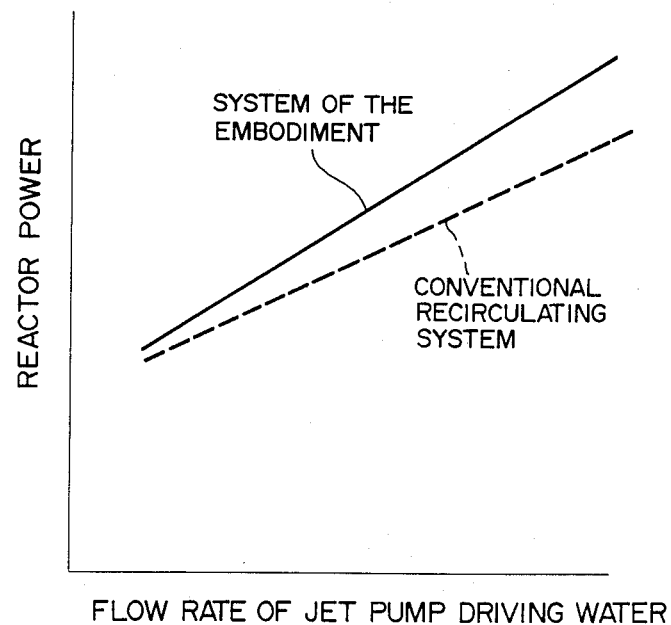
FIG. 9 is a characteristic diagram illustrating the relationships between the flow rate of jet pump driving water and the reactor output.

A change in the reactor power through the control of flow rate of the driving water in the jet pump in accordance with this embodiment is identical as the one encountered in the conventional BWR power plant having a recirculating system. However, the conventional recirculating system employs the flow of jet pump driving water having substantially the same temperature as that of the suction flow in the jet pumps. In contrast, in this embodiment, the temperature of the core flow rate undergoes slight change upon being influenced by the effect of a temperature change (approx. 1/10 if the M ratio is 10) of the jet pump driving water flow 31A, so that this slight change further changes the core void reactivity. Accordingly, as shown in FIG. 9, the variation characteristics of the reactor power in this embodiment slightly differ from a case where a conventional recirculating system is used. The variation characteristics of the former assume a higher level than that of the latter.

(III) Protective Control During Emergency

In the BWR power plant having the conventional recirculating system, the control of the reactor water level is effected using the flow rate $W_{FW}$ of the total feed water. In this embodiment, however, a major portion of the feed water ($2 \cdot W_{FM}/3$) is used for the control of the reactor output discharged into the jet pumps 6, while the remaining portion of the feed water ($W_{FW}/3$) is used for the control of the reactor water level. Accordingly, the capability of adjusting the reactor water level is smaller than that of the BWR power plant having the conventional recirculating system. This does not present problems during normal operation. However, when the plant status of the BWR power plant involves a sudden and substantial change and when that change is abnormal, there is a possibility that a substantial decrease occurs in the reactor water level. It is necessary to avoid the occurrence of such a phenomenon. For this reason, the following two measures are adopted in this embodiment to cope with this situation.

First, the capacities of the feed water pumps 28, 29 are made large. The minimum capacities required of the feed water pumps 28, 29 are $2W_{FW}/3$ and $W_{FW}/3$, as described above. If these pump capacities are made large, the scope of control of the reactor power and the scope of control of the reactor water level become large by that portion. Hence, the pump capacity of the feed water 28 is increased to 300%, the pump capacity of the feed water pump 29 to 105%, and the pump capacity of the condenser pump 23 to 170% of the conventional levels. As a result, even if a sudden decline occurs in the reactor water level $L_R$, it is possible to temporarily increase the feed water sparger flow rate $W_S$.

Secondly, a measure is taken to provide protection by means of the plant status discriminator 73. The arrangement of the plant status discriminator 73 will be described with reference to FIG. 8. The plant status discriminator 73 has flow-rate request signal adjusters 73A, 73B, a limiter 73C, a status discriminator 73D, a temperature estimator 73E, an operating status discriminator 73F, and an adder 73G. Input to the plant status discriminator 73 are a trip signal $SW_T$, a plant status amount $X_P$ measured by a detector installed in the BWR power plant, the feed water temperature $T_J$ in the feed water pipe 31 measured by the thermometer 54, the feed water temperature $T_S$ in the feed water pipe 33 measured by the thermometer 55, and the reactor power $Q_R$ measured by the power detector 56, as well as the sparger flow-rate request signal $W_{SO}$ and the jet pump driving water flow-rate request signal $W_{JD}$.

Upon receiving the trip signal $SW_T$, the status discriminator 73D discriminates whether or not the plant status amount $X_P$, which is subject to the effect of that trip signal $SW_T$, has deviated from a predetermined level. When the trip signal $SW_T$ is not input and when the plant status amount $X_P$ is within the predetermined level even if the trip signal $SW_T$ has been input, the status discriminator 73D outputs as a valve changeover signal $S_{9C}$ an open signal to the shut-off valve 35 and a close signal to the shut-off valve 44. When it is judged that the plant status amount $X_P$ has deviated from the predetermined level, the status discriminator 73D outputs to at least one of the flow-rate request signal adjustors 73A, 73B at least one relevant signal of signals $S_S$, $S_J$ for instructing a change in the flow-rate request signals in correspondence with the trip signal $SW_T$. At the same time, the status discriminator 73D outputs the valve changeover signal $S_{9C}$ to the shut-off valves 35, 44 so as to close the shut-off valve 35 and open the shut-off valve 44 in correspondence with the trip signal $SW_T$. No need arises to change over the opening and closing of the shut-off valves 35, 44 depending on the trip signal $SW_T$. Upon receiving the change instruction signal $S_S$, the flow-rate request signal adjuster 73A corrects the sparger flow-rate request signal $W_{SO}$ into the sparger flow-rate request signal $W_{SP}$ in response to the signal $S_S$, and outputs the signal $W_{SP}$ to the feed water pump 29. Upon receiving the change instruction signal $S_J$, the flow-rate request signal adjuster 73B corrects into the jet pump driving water flow-rate request signal $W_{JD}$ a jet pump driving water flow-rate request signal $W_{JO}$, output from the limiter 73C in response to that signal $S_J$, and outputs that signal $W_{JD}$ to the feed water pump 28. When a discrimination result signal LM output from the operating status discriminator 73F is zero (i.e., when the operating status is normal), the limiter 73C outputs to the flowrate request signal adjuster 73B the jet pump driving water flow-rate request signal $W_{JO}$ as it is as the jet pump driving water flow-rate request signal $W_{JO'}$.

A description will now be given of the operation of the flow-rate request signal adjusters 73A, 73B and the status discriminator 73D with respect to a specific trip signal $SW_T$, e.g. a Main Steam Separator Valve Close signal.

Upon issuance of the Main Steam Separator Valve Close signal, the control rods 4 are inserted rapidly into the core 2, with the result that the core 2 is set in a scram. When the reactor water level $L_R$ has dropped to a predetermined level, the status discriminator 73D, upon receiving the Main Steam Separator Valve Close signal, outputs the following signals: the change instruction signal $S_S$ of Feed water Sparger Flow-Rate Request Signal $W_{SO}$ increase, the change instruction signal $S_J$ of Jet Pump Driving Water Flow-rate Request Signal $W_{JO}$, and the valve changeover signal $S_{9C}$ for closing the shut-off valve 35 and opening the shut-off valve 44. When the trip signal $SW_T$ is the Main Steam Separator Valve Close signal, the change instruction signals $S_S$, $S_J$ and the valve changeover signal $S_{9C}$ are output. The shut-off valve 35 is closed and the shut-off valve 44 is opened by the valve changeover signal $S_{9C}$. The flow-rate request signal adjuster 73A outputs the feed water sparger flowrate request signal $W_{SP}$ in which the feed water sparger flow-rate request signal $W_{SO}$ is increased on the basis of the change instruction signal $S_S$. The flow-rate request signal adjuster 73B outputs the jet pump driving water flow-rate request signal $W_{JO'}$ as the jet pump driving water flow-rate request signal $W_{JD}$ on the basis of the change instruction signal $S_J$. These signals do not change the number of revolutions of the feed water pump 28, but increases the number of revolutions of the feed water pump 29. The feed water delivered from the feed water pump 28 is supplied from the feed water sparger 8 into the reactor pressure vessel 1 via the feed water pipe 31, the bypass pipe 43, and the feed water pipe 33. Although the flow rate of the feed water supplied from the feed water sparger 8 increases, the reactor water level $L_R$ inside the reactor pressure vessel 1 is held at a predetermined level by virtue of the function of the feed water/reactor power controller 70, particularly the water level controller 71. Incidentally, the reason for closing the shut-off valve 35 and opening the shut-off valve 44 by means of the valve changeover signal $S_{9C}$ is to prevent a large quantity of the reactor flow from being supplied into the reactor core 2 after a scram as a result of driving the jet pumps 6 on the basis of the operation of the feed water delivered from the nozzles 32.

When a turbine trip has occurred, the status discriminator 73D does not output the valve changeover signal $S_{9C}$ but outputs the change instruction signal $S_S$ and $S_J$ for decreasing the feed water sparger flow-rate request signal $W_{SO}$ and the jet pump driving water flow-rate request signal $W_{JO'}$ to a predetermined level.

By virtue of the above-described arrangement, it is possible to prevent the reactor water level $L_R$ from undergoing a sudden change during tripping of various kinds.

The status discriminator 73D has a memory for storing the change instruction signals $S_S$ and $S_J$ and the valve changeover signal $S_{9C}$ with respect to various kinds of trip signal $SW_T$. This memory may be provided separately from the status discriminator 73D. The status discriminator 73D retrieves from the memory each signal corresponding to the trip signal $SW_T$ input.

The plant status discriminator 73 has a first protecting section constituted by the flow-rate request signal adjusters 73A, 73B and the status discriminator 73D and adapted to correct each flow-rate request signal during a trip as well as a second protecting section for restricting the jet pump driving water flow-rate request signal when the operating status has deviated from the allowable range, which will be described below. A detailed description will now be made of the second protecting section.

Figure 10:
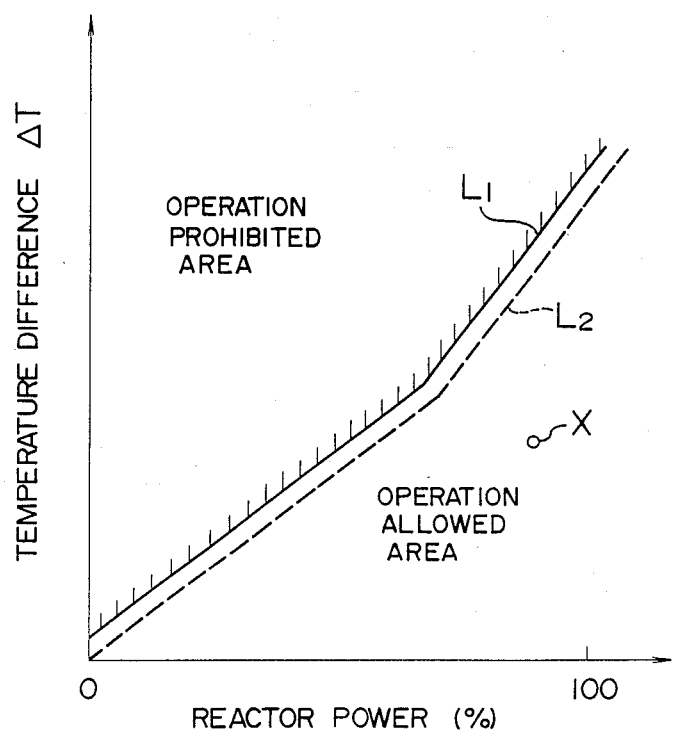
FIG. 10 is a characteristic diagram illustrating the relationships between the reactor output and a temperature difference $\Delta T$.
Figure 11:
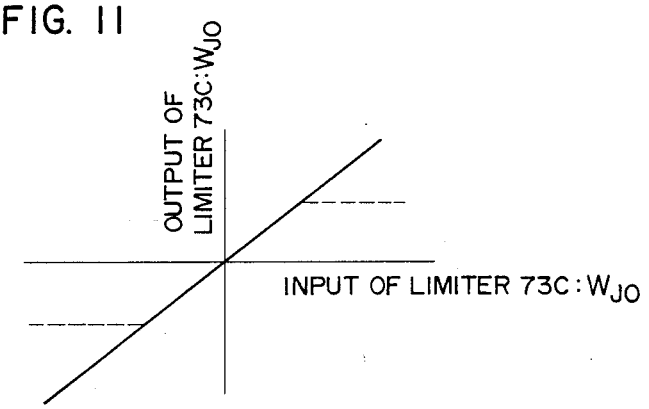
FIG. 11 is a characteristic diagram of the operation of a limiter shown in FIG. 8.

The temperature estimator 73E determines the temperature $T_{JSC}$ of the suction flow 45A sucked into the jet pumps 6 on the basis of the temperature of the feed water sparger water in the same way as the temperature estimator 46A. The temperature difference $\Delta T$ between the temperature $T_{JSC}$ and the temperature $T_J$ of the jet pump driving water is determined by the adder 73G. Upon receiving the reactor power $Q_R$ and the temperature difference $\Delta T$, the operating status discriminator 73F discriminates whether or not the current operating status determined by these values is within an allowable range. The operating status discriminator 73F stores characteristics based on the reactor power $Q_R$ and the temperature difference $\Delta T$, as are shown in FIG. 10. In FIG. 10, the area above the line $L_1$ is an operation prohibited area. The line $L_2$ represents an alarm issuing line, and the area below the alarm issuing line $L_2$ is the operation allowed area. When the position determined by the reactor power $Q_R$ and the temperature difference $\Delta T$ is in the operation allowed area, the operating status of the BWR power is normal. When that position is in the area above the alarm issuing line $L_2$, the operating status of the BWR power plant is in an abnormal status. The operating status discriminator 73F outputs the discrimination result signal LM with a level "0" when the operating status is normal, and outputs the discrimination result signal LM with a level "1" when the operating status is abnormal. When the operating status is abnormal, the point X determined by the reactor power $Q_R$ and the temperature difference $\Delta T$ is located in the area above the alarm issuing line $L_2$. When the point X has come into contact with the alarm issuing line $L_2$ from below, the operating status discriminator 73F issues an alarm, and this alarm is displayed on a display unit (not shown). The discrimination result signal LM is input to the limiter 73C. The limiter 73C has the control characteristics shown in FIG. 11. The solid line represents the characteristics at the time when the discrimination result signal LM is "0", while the broken lines represent the characteristics at the time when the signal LM is "1". Accordingly, the limiter 73C restricts the jet pump driving water flow-rate request signal $W_{JO}$ input when the operating status is abnormal, to the values of the jet pump driving water flow-rate request signal $W_{JO}$, indicated by the broken line. As a result, the point X is held at a position on the alarm issuing line $L_2$. Accordingly, the flow rate of the jet pump driving water is prevented from being controlled to such a flow rate which involves the occurrence of the cavitation in the jet pumps 6.

(IV) Control for Improving the Response Characteristics of Generator Output

Figure 12:
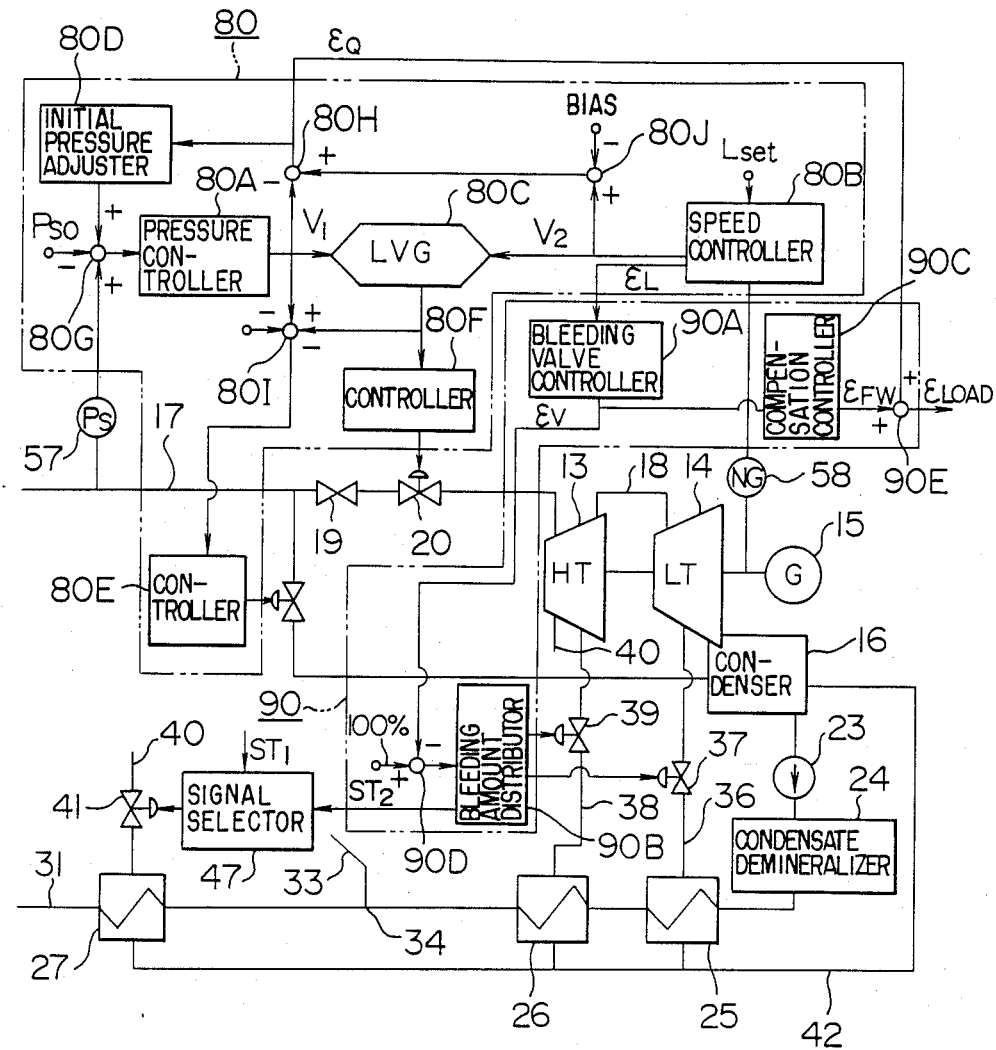
FIG. 12 is a detailed schematic diagram of a turbine controller and a bleeding valve controller shown in FIG. 1.

This control is effected by the turbine controller 80 and the blending valve controller 90. A detailed arrangement of these controllers is shown in FIG. 12.

The turbine controller 80 has a pressure controller 80A, a speed controller 80B, a low-value preference gate 80C, an initial pressure adjuster 80D, controllers 80E, 80F, and adders 80G–80J. The bleeding valve controller 90 has a bleeding valve controller 90A, a bleeding amount distributor 90B, a jet pump driving water flow-rate compensating/controlling device 90C, and adders 90D, 90E.

The electric generating power of the generator 16 is determined by a real amount of steam flowing through the high- and low-pressure turbines 13, 14. This amount of steam is adjusted by the steam regulator valve 20. There are two modes in controlling the amount of opening of the steam regulator valve 20.

The first mode is designed to control the steam pressure $P_S$ of the reactor pressure vessel 1 (measured by the pressure gauge 57 provided in the main steam pipe 17) such as to assume a value close to the set pressure $P_{SO}$ (the reactor pressure is controlled to a fixed level). Namely, the measured pressure $P_S$, the set pressure $P_{SO}$, and the initial pressure which is an output of the initial pressure adjuster 90D are added to the adder 80G, and a deviation signal between the initial pressure and the measured pressure $P_S$ on the one hand, and the set pressure $P_{SO}$ on the other, is input to the pressure controller 80A. The pressure controller 80A outputs a signal $V_1$ on the basis of the deviation signal. The signal $V_1$ is output to the low-value preference gate 80C and the adders 80I, 80H. The low-value preference gate 80C selects a lower-level signal between the signal $V_1$ and a signal $V_2$ and then outputs the same to the controller 80F. Normally, the signal $V_1$ is smaller and is therefore selected. The controller 80F controls the amount of opening of the steam regulator valve 20 on the basis of the output signal of the low-value preference gate 80C. The controller 80E controls the amount of opening of the bypass valve 22 on the basis of the signal $V_1$ obtained by the adder 80I as well as a signal of deviation between the output signal of the low-value preference gate 80C and a bias signal. For instance, if the reactor output increases, the steam pressure also increases, so that the steam regulator valve 20 is opened by the signal $V_1$ so as to increase the amount of steam supplied to the turbine. Consequently, the output of the generator 5 increases.

The second mode is designed to cope with requirements on the power system side as well as changes in the rotational speed of the generator 15. The speed controller 80E determines a value of deviation between a targeted value L set and the rotational speed $R_M$ of the generator 15 (turbine) measured by the tachometer 58, and outputs the signal $V_2$ corresponding to this deviation value. In addition, the speed controller 80B extracts from the signal $V_2$ a component of a small output change in a short period (in a period of several tens of seconds and with the amplitude of variation being within 5%) which require speedy response, thereby prepares a load change request signal e, and outputs the same to the bleeding valve controller 90A. The signal $V_2$ is input to the low-value preference gate 80C and the adder 80J. When not the signal $V_1$ but the signal $V_2$ is selected by the low-value preference gate 80C, the controller 80F effects the control of the amount of opening of the steam regulator valve 20 on the basis of the signal $V_2$. The adder 80J outputs to the adder 80H a signal in which the signal $V_2$ is added to the bias signal. The adder 80H, in turn, outputs a signal of deviation (a jet pump driving water flow-rate change request signal $\epsilon_Q$) between the signal $V_1$ and the output signal of the adder 80J to the initial pressure adjuster 80D and the adder 90E of the bleeding valve controller 90. The jet pump driving water flow-rate change request signal $\epsilon_Q$ is a reactor output change request signal.

The above-described two modes are selected by the low-value preference gate 80C. A bias value of 10% in terms of the reactor power is added to the signal $V_2$ by the speed controller 80B in such a manner that the first mode is selected at the time of the normal operation of the BWR power plant. However, when the variation of the rotational speed $R_M$ is large and the $V_2$ fluctuates substantially, the steam regulator valve 20 is adjusted by the signal $V_2$. In order to cause the generator output to respond speedily, the initial pressure regulator 80D is adapted to auxiliary move the steam regulator valve 20 before the appearance of the effect of the response (considerably lagging) of the water level/output controller 70 for controlling the flow rate of the jet pump driving water.

In this example, the output signal of the bleeding valve controller 90A is used to control the bleeding valves 37, 39, and 41, and that output signal is also used to compensate the jet pump driving water flowrate change request signal $\epsilon_Q$ output from the turbine controller 80. The load change request signal $\epsilon_{LOAD}$ obtained by the compensation is output to the reactor power master controller 72 of the water level/reactor power controller 70 via the general controller 60.

Upon receiving the load change request signal $\epsilon_L$, the bleeding valve controller 90A determines a bleeding valve closing-amount signal $\epsilon_V$ (the opposite of the opening amount signal) on the basis of that signal $\epsilon_L$, and outputs this signal to the bleeding amount distributor 90B and the jet pump driving water flow-rate compensation controller 90C. The bleeding amount distributor 90B designates each closing amount to the bleeding valves 37 and 39, and designates the amount of opening the bleeding valve 41 on the basis of the temperature difference $\Delta T$ output from the feed water temperature controller 46. The control of the amount of opening of the bleeding valve 41 by the bleeding amount distributor 90B is performed when the temperature difference $\Delta T$ has exceeded the alarm issuing line $L_2$ shown in FIG. 10. The jet pump driving water flow-rate compensation controller 90C outputs a jet pump driving water flow-rate compensation signal $\epsilon_{FW}$ in proportion to the bleeding valve closing-amount signal $\epsilon_V$ input, so as to compensate a decline in the feed water temperature at the reactor inlet. This signal $\epsilon_{FW}$ is input to the adder 90E. The adder 90E effects compensation by adding the compensation signal $\epsilon_{FW}$ to the jet pump driving water flow-rate change request signal $\epsilon_Q$, and outputs to the general controller 60 the load change request signal $\epsilon_{LOAD}$ obtained by compensation. Upon receiving the load change request signal $\epsilon_{LOAD}$ from the general controller 60, as described above, the water level/reactor power controller 70 adjusts the number of revolutions of the feed water pump 28 on the basis of this request signal. The core flow rate is thus altered.

The arrangement of the bleeding valve controller 90A and the bleeding amount distributor 90A will now be described. Specifically, the bleeding valve controller 90A has the arrangement shown in FIG. 13 and is provided with a switch $90A_1$ and an adjuster $90A_2$. The switch $90A_1$ is normally closed, and can be opened, for instance, manually when the functions of this embodiment are not performed. The adjuster $90A_2$ is a proportional/integration-type adjuster. As shown in FIG. 14, the bleeding amount distributor 90B has bleeding valve opening-amount controllers 91, 92 and a function generator 93. The function generator 93 is connected to the output detector 56 and the adder 9aA. The bleeding valve opening-amount controller 91 is adapted to control the amount of opening of the bleeding valve 41 and is provided with adder 91A, 91D, a function generator 91B, and a PI controller 91C. The adder 91 is also connected to the feed water temperature controller 46 and the function generator 91B. The PI controller 91C is connected to the function generator 91B. The adder 91D is connected to an output terminal of the PI controller 91C and an input terminal of the signal selector 47. The bleeding valve opening-amount controller 92 for adjusting the amounts of opening of the bleeding valves 37, 39 has adjusters 92A, 92B connected to the adder 90D, the adjuster 92A being connected to the bleeding valve 37, the adjuster 92B being connected to the bleeding valve 39.

The response of each part according to this embodiment will now be described below. First, an increased load of the electric power system results in a decline in the rotational speed (detected by the tachometer 58) of the generator 15 (turbine). This decline is detected by the speed controller 80B as the load change request signal $\epsilon_L$ (normally zero; in this case, a positive value). Upon receipt of the load change request signal $e_L$, the bleeding valve controller 90A determines the closing-amount signal $\epsilon_V$ which indicates an amount by which the bleeding valve should be closed by a proportional-/integration-type adjuster $90A_2$ (with a proportional gain $K_P$ and an integral gain $K_I$). This closing-amount signal $\epsilon_V$ is transmitted to the jet pump driving water flow-rate compensation controller 90C and the adder 90D. Since the function of the controller 90C has already been described, a description thereof will be omitted.

A deviation signal $V_3$ determined by the adder 90D is transmitted to the bleeding amount distributor 90B, and is input to the adjusters 92A, 92B of the bleeding valve opening-amount controller 92. The adjuster 92A output to the bleeding valve 37 an opening-amount signal $ST_3$ corresponding to the deviation signal $V_3$. The bleeding valve 37 is thus adjusted to a corresponding amount of opening on the basis of the opening-amount signal $ST_3$. The adjuster 92B outputs to the bleeding valve 39 an opening-amount signal $ST_4$ corresponding to the deviation signal $V_3$. The bleeding valve 39 is thus adjusted to a corresponding amount of opening on the basis of the opening-amount signal $ST_4$ The bleeding valve opening-amount controller 92 controls the amounts of opening of the bleeding valves 37, 39 so as to speedily respond to changes in the output of the generator 15 (in a period of several tens of seconds and the amplitude of variation falling within 5%) on the basis of the output of the tachometer 58. Therefore, it is possible to cope within a short time with variation in the output of the generator 15 which have short periods and small amplitude. In other words, since the amounts of opening of the bleeding valves 37, 39 are reduced sharply on the basis of the opening-amount signals $ST_3$, $ST_4$ to reduce the extracted amounts of steam, with the result that the rotational speeds of the turbines 13, 14 are increased and $\epsilon_L$ is returned quickly to zero.

The temperature difference $\Delta T$ obtained from the adder 46B of the feed water temperature controller 46 is input to the adder 9aA of the bleeding valve opening-amount controller 91. The function generator 93 determines the temperature difference $\Delta T_1$ on the basis of the reactor power $Q_R$ measured by the reactor power detector 56. The function generator 93 stores a relation (equivalent to the formula of the alarm issuing line $L_2$) indicating the relationships between the temperature difference $\Delta T_1$ and the reactor power $Q_R$ The temperature difference $\Delta T_1$ obtained by the function generator 93 is input to the adder 91A, which calculates the deviation signal $U$ ($=\Delta T_I - \Delta T$). When the deviation signal $U$ is 0 or above, the function generator 91B outputs a signal $V_4$ having a level 0, and outputs negative signal $V_4$ corresponding to a case where the deviation signal $U$ is negative. The PI controller 91C outputs a control signal on the basis of the signal $V_4$. The adder 91D determines an opening-amount signal $ST_2$ on the basis of this control signal, and outputs the opening-amount signal $ST_2$ to the signal selector 47. As described above, the signal selector 47 selects either the opening-amount signal $ST_1$ or $ST_2$ thus input, and transmits the selected opening-amount signal to the bleeding valve 41. The amount of opening of the bleeding valve 41 is adjusted on the basis of the opening-amount signal selected by the signal selector 47. By decreasing the amount of opening of the bleeding valve 41 on the basis of the opening-amount signal $ST_2$, it is possible to promptly shift the operation to that in the operation allowed area below the alarm issuing line $L_2$ even if the temperature difference $\Delta T$ corresponding to a given reactor output $Q_R$ exceeds the alarm issuing line $L_2$. The bleeding valve opening-amount controller 91 is a kind of protector which is designed to shift the operation of the nuclear reactor to that in a safe status when the operation of the reactor is taking place in the area above the alarm issuing line $L_2$.

The response characteristics of control based on the function of the bleeding valve opening-amount controller 92 is shown in the time axis on a short-time scale in FIGS. 15A to 15G. The effect of an increase or decrease of the extracted amount of steam affects the turbine inlet side and the reactor pressure vessel side as well, and various variables follow a system output request QL (reflected on the load change request signal $\epsilon_L$) accompanied by their peculiar delays and amplitude. Accordingly, it is possible to obtain extremely good load-following characteristics as a whole.

However, when a situation occurs in which the load change request signal $\epsilon_L$ oscillates only on the positive value side over a relatively long period of time (more than several minutes) due to a change in the load requirements of the electric power system and a set point of load, the turbine output at this time also responds immediately by the control of the extracted steam described above. However, since the bleeding valves are held in a slightly closed state rather than in a fully closed state, the extracted amounts of steam supplied to the feed water heaters 25, 26 become small, so that the feed water temperatures being to decline gradually.

Figure 13:
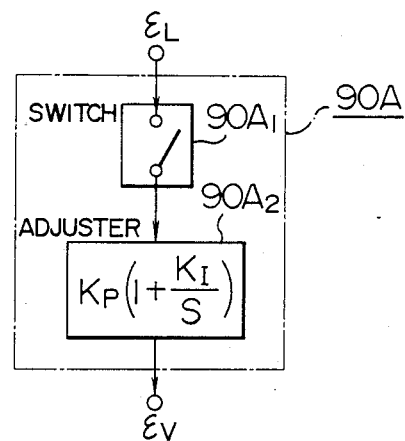
FIG. 13 is a detailed schematic diagram of the bleeding valve controller of FIG. 12.

In this embodiment, to compensate for this drop in the feed water temperatures, the load change request signal $\epsilon_{LOAD}$ obtained by the signal $\epsilon_{FW}$ proportional to the bleeding valve closing-amount signal $\epsilon_V$ is transmitted to the reactor power master controller 72 of the water level/reactor power controller 70 via the general controller 60, as described above. In other words, as shown in FIG. 13, since an integral term KI/S (KI denotes an integral gain) is included in the bleeding valve controller 90A, the signal $\epsilon_V$ indicates an integral value of the signal $\epsilon_L$, or, to put it differently, an integral amount of the extracted amount of steam cut. Accordingly, if the flow rate of the jet pump driving water (core flow rate) is increased by a portion commensurate with this integral amount, the reactor power gradually bears the increment of the turbine output, so that the cut amount of the extracted steam finally becomes zero. Hence, a substantial decline in the feed water temperatures does not occur.

To give a detailed description, as the flow rate of the jet pump driving water increases (whose speed is determined by the water level/reactor power controller 70), the reactor power increases, and the turbine controller 80 opens the steam adjusting valve CV to make the reactor power constant. Therefore, the rotation speed of the turbine (generator 15) tends to be increased further higher than the target value, the level of the signal becomes negative value, the level of the signal tends to be gradually lowered, and the bleeding valves 37, 39 tend to be more widely or more fully opened. In this embodiment, the increase in the output or power of the generator 15 at the time of increase in the set load in case of the operation following the load or at the time of increase in the load of the power system is initially compensated or supported by the cut of an amount of the bleeding steam, and is then compensated or supported by the increase in the reactor power. When the reactor power is increased, the opening-amounts or degrees of opening of the bleeding valves 37, 39 are returned to the original levels of 100%, and the temperature of the feed water is not continued to be lowered. Especially, as the recirculating flow rate request signal $\epsilon_Q$ is adjusted according to the signal $\epsilon_{FW}$, the decrease in the temperature of the feed water can be limited in a short time and the thermal shock to the structure in the reactor pressure vessel can be moderated.

The response of various variables or parameters with respect to time in the long-term time scale are shown in FIGS. 15A through 15G.

When the feed water temperature is lowered and when the increase/decrease in the temperature of the feed water is repeated at a considerable period, it is conceivable first and foremost that there are cases where the repeated thermal stress in the structural materials or structures such as the feed water nozzles may become a problem or the cause of the problem. In this embodiment, the thermal shock which occurs in internal structures at this time can be restrained, and the thermal fatigue occurring in the structures can be reduced remarkably. Secondly, it is conceivable that the core 2 experiences a large change in the thermal behavior. Namely, when the reactor power is increased by the same degree, an amount of shift in the boiling start point is small in the case where the increase in the reactor power is based on an increase in the core flow rate, whereas the boiling start point sifts substantially in the case where it is based on a decline in the feed water temperatures. Concomitantly, the axial distribution of output increases substantially in an average manner in the case where the reactor power is increased by an increase in the core flow rate. However, in the case where the reactor power is increased by the decline in the feed water temperature, local changes are large, and the strain becomes great as compared with the distribution prior to the change in the reactor output. Accordingly, changes in the feed water temperatures entail a shift in hot spots, and therefore the position where the hot spots occur shifts repeatedly. In accordance with this embodiment, this problem can also be solved.

Furthermore, in this embodiment, the provision of the bleeding valve controller 90 enables changes in the outputs with small amplitude and short periods (normally, this is called an AFC operation and the governor-free operation mode). In addition, since the combined used is made of the control of the flow rate of the jet pump driving water (controlled by the water level/reactor power controller 70), which is the feed water for controlling reactor power changes with large and relatively slow fluctuations, the present invention provides a function of changing reactor power with large fluctuations.

It should be noted that the bleeding valve opening-amount controller 92 and the function generator 93 may be removed from the bleeding amount distributor 90B and may be installed in the feed water temperature controller 46 together with the signal selector 47.

(V) General Controller

Lastly, a description will be given of a specific arrangement of the general controller 60. The general controller 60 controls the water level/reactor power controller 70, turbine controller 80, bleeding valve controller 90, and control rod driving apparatus controller 100, and transmits and receives signals to and from these controllers.

The general controller 60 has a load change request signal evaluating section 60A and a controller selecting section 60B. Information concerning the status of the overall plant including the controllers is also input to the general controller 60. The load change request signal evaluating section 60A analyzes and evaluates the load change request signal $\epsilon_{LOAD}$ output from the bleeding valve controller 90. Namely, the load change request signal $e_{LOAD}$ is evaluated with respect to a variation amplitude $\Delta Q$ and a time variation rate (or a cycle and a frequency component).

The controller selecting section 60B has a controller selector 60C and adjusters 60D-60G. The controller selector 60C determines which signal should be transmitted to which controller with a certain degree of priority. For instance, the controller selector 60C outputs necessary control information, i.e., a component of a output change of a several percent in a period of several seconds to several minutes to the turbine controller 80, a component of an output change with small amplitude in a shorter period than the above period to the bleeding valve controller 90, a component of a reactor power change with large amplitude in a period of several minutes or more to the water level/reactor power controller 70, and a component of a slow, drifting output change to the control rod driving apparatus controller 100, respectively. In addition, information is exchanged among the adjusters 60D-60G , and adjustment is made by the controller selecting section 60B such that the overall controllers are free from mutual interference and thus become stable. For instance, the non-interference control is carried out on the basis of a theory on a multi-variable controller.

A description will be given hereafter of the other embodiments of the present invention.

Another embodiment provides a method of controlling the temperatures of the jet pump driving water and the feed water sparger water such as to assume targeted values by measuring these temperatures so that the cavitation will not occur during the operation of the jet pumps driven by the feed water. The arrangement in this case will be described with reference to FIG. 1. The extracted steam supplied to the feed water heaters 25, 26, and 27 is controlled by adjusting the bleeding valves 37, 38, and 41 respectively provided in the bleeding pipes 36, 38, and 40 on the basis of the temperatures ($T_J$ and $T_S$) of the jet pump driving water and the feed water sparger water measured which are input to the bleeding valve controller 90. In other words, it is necessary for the bleeding valve controller 90 to operate the bleeding valves 37, 39 so as to control the temperature of the feed water sparger water, and also to adjust the amount of opening of the bleeding valve 41 by taking into account the amounts of opening of the bleeding valves 37, 39 so as to control the temperature of the jet pump driving water. The temperatures of the two kinds of feed water (those flowing through the feed water pipes 31 33) generally have a large time lag and a wasteful time, so that the bleeding valve controller 90 in this embodiment is preferably controlled on the basis of a program.

Figure 17:
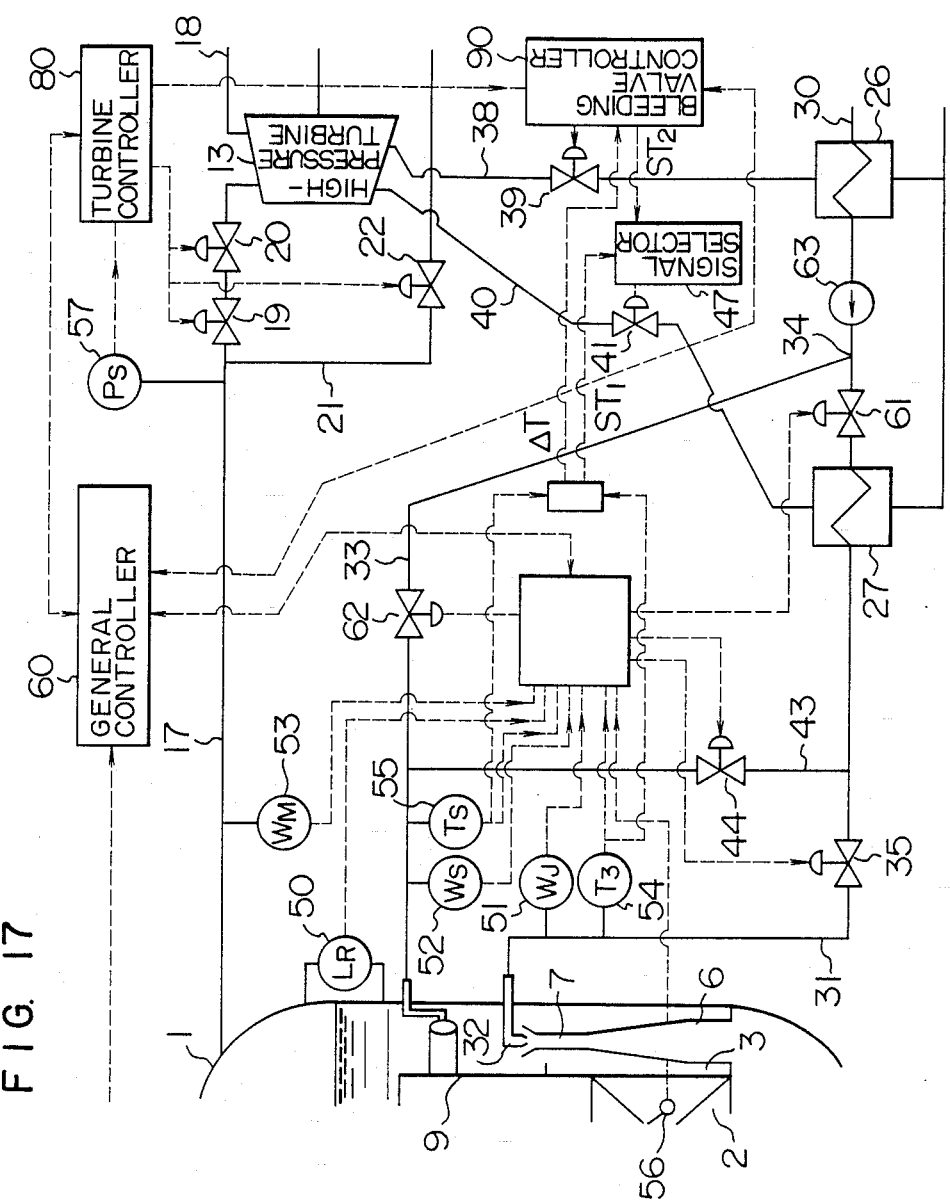

Still another embodiment of the present invention is shown in FIG. 17. The nuclear power plant in accordance with this embodiment is provided with flow-rate control valves 61, 62 which substitute the feed pumps 28, 29 functioning as the feed water flow-rate controlling means in the feed water pipes 31, 33 in the embodiment shown in FIG. 1. Further, a feed water pump 63 is installed at the feed water pipe between the high-pressure feed water heater 26 and the branching point 34. The other arrangements of this embodiment are the same as those of the embodiment shown in FIG. 1. The flow-rate control valve 61 is disposed in the feed water pipe 31 between the high-pressure feed water heater 27 and the branching point 34. In addition, the flow-rate control valve 62 is disposed in the feed water pipe 33. The amount of opening of the flow-rate control valve 61 is controlled by the jet pump driving water flow-rate request signal $W_{JD}$. The amount of opening of the flow-rate control valve 62 is controlled on the basis of the feed water sparger water flow-rate request signal $W_{SP}$.

With this embodiment, it is possible to obtain the same effect as that of the nuclear power plant shown in FIG. 1.

Figure 18:
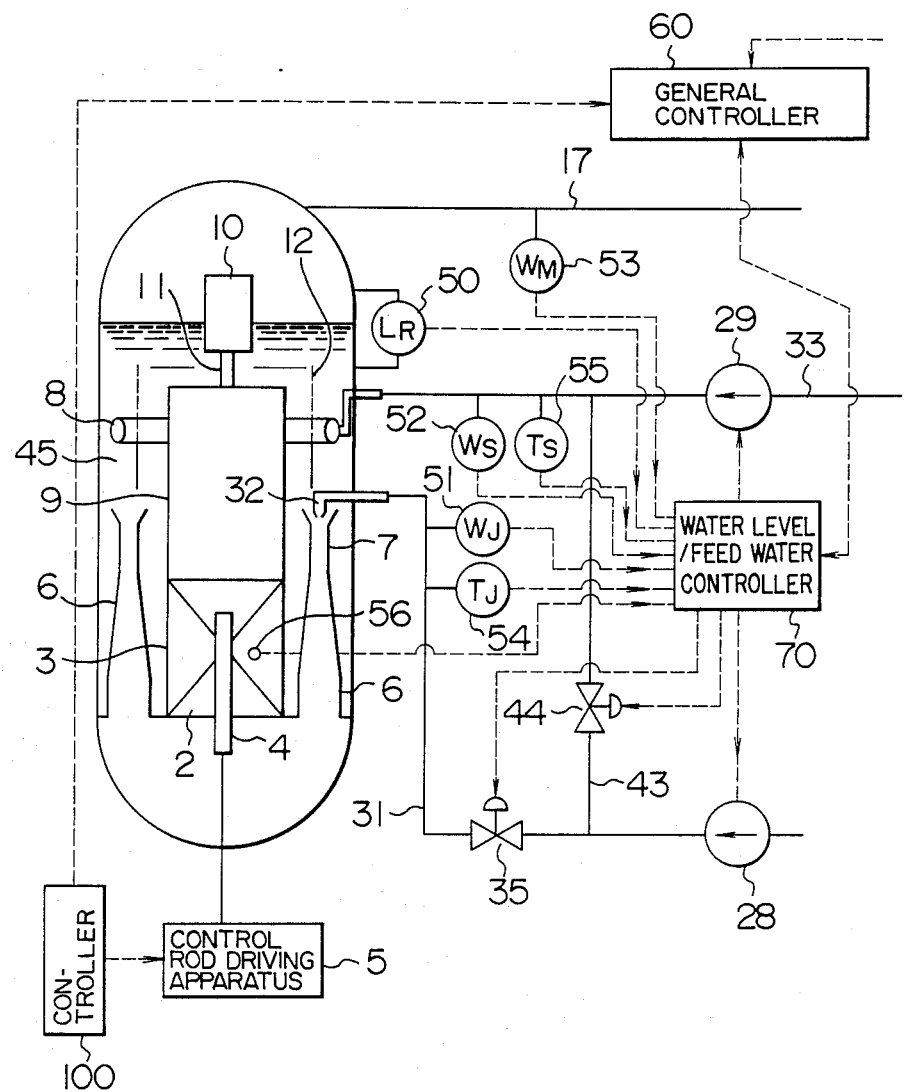

FIG. 18 shows a further embodiment of the present invention. In this embodiment, a baffle cylinder 12 is added to the arrangement of the embodiment shown in FIG. 1. The baffle cylinder 12 is disposed between the riser portion 9 and the feed water sparger 8.

The baffle cylinder 12 is disposed concentricaly with the riser portion 9, a lower end thereof extending down to the vicinity of the upper portions of the jet pumps 6. A multiplicity of small holes are provided in an upper portion of the baffle cylinder 12.

A large quantity of high-temperature cooling water separated by the steam separator 10 is discharged outside the steam separator 10 and is mixed with the cooling water in an upper portion of the reactor pressure vessel 1. The temperature of this cooling water rises by being mixed with the large amount of high-temperature cooling water. The baffle cylinder 12 functions to control this high-temperature cooling water so as to be prevented from being mixed as a whole with the low-temperature feed water discharged from the feed water sparger 8. Since the baffle cylinder 12 is provided with the small holes, only a portion of the high-temperature cooling water is mixed with the low-temperature feed water. The high-temperature cooling water exists inside the baffle cylinder 12. Accordingly, the cooling water outside the baffle cylinder 12 maintains a state of low temperature and is sucked into the jet pumps 6.

The nuclear power plant in accordance with this embodiment provides a similar effect to that of the embodiment shown in FIG. 1. Furthermore, by virtue of the effect derived from the installation of the baffle cylinder 12, the temperature of the cooling water sucked into the jet pumps 6 is lowered as compared to the embodiment shown in FIG. 1.

FIGS. 19 and 20 show a still further embodiment of the present invention. These drawings illustrate a structure of a jet pump and its peripheral equipment in the reactor pressure vessel 1 in accordance with this embodiment. In this embodiment, the jet pump is arranged in two stages in a series. The other arrangements are identical to those of the embodiment shown in FIG. 1. Two jet pumps 6B, 6C are arranged in parallel. A jet pump 6A is disposed above the jet pumps 6B, 6C. The nozzle 32 is inserted into an upper end portion of the jet pump 6A. Two nozzles 64A, 64B are provided at a lower end portion of the jet pump 6A, i.e., the delivery side of the cooling water. These nozzles 64A, 64B are inserted into the upper end portions of the jet pumps 6B, 6C. If it is assumed that the M ratio of the jet pump 6A is $M_1$ and that the M ratio of the jet pumps 6B, 6C is $M_2$, the M ratio of the overall two-stage jet pumps is given by $(M_1+M_2\times(M_1+1))$. A lower end of the baffle cylinder 12 disposed inside the feed water sparger 8 reaches an upper end of the jet pump 6A or thereabout. Reference numeral 12A denotes the small holes provided in the baffle cylinder 12.

The jet pump 6A mainly sucks the low-temperature cooling water located outside the baffle cylinder 12 by means of the jet pump driving water (supplied through the feed water pipe 31) injected from the nozzle 32. The cooling water sucked into the jet pump 6A is injected from the nozzles 64A, 64B and serves as the driving water for the jet pumps 6B, 6C. This embodiment makes it possible to increase the M ratio without any occurrence of cavitation in the jet pumps. Moreover, the extent to which the occurrence of the cavitation can be prevented is large.

Figure 21:
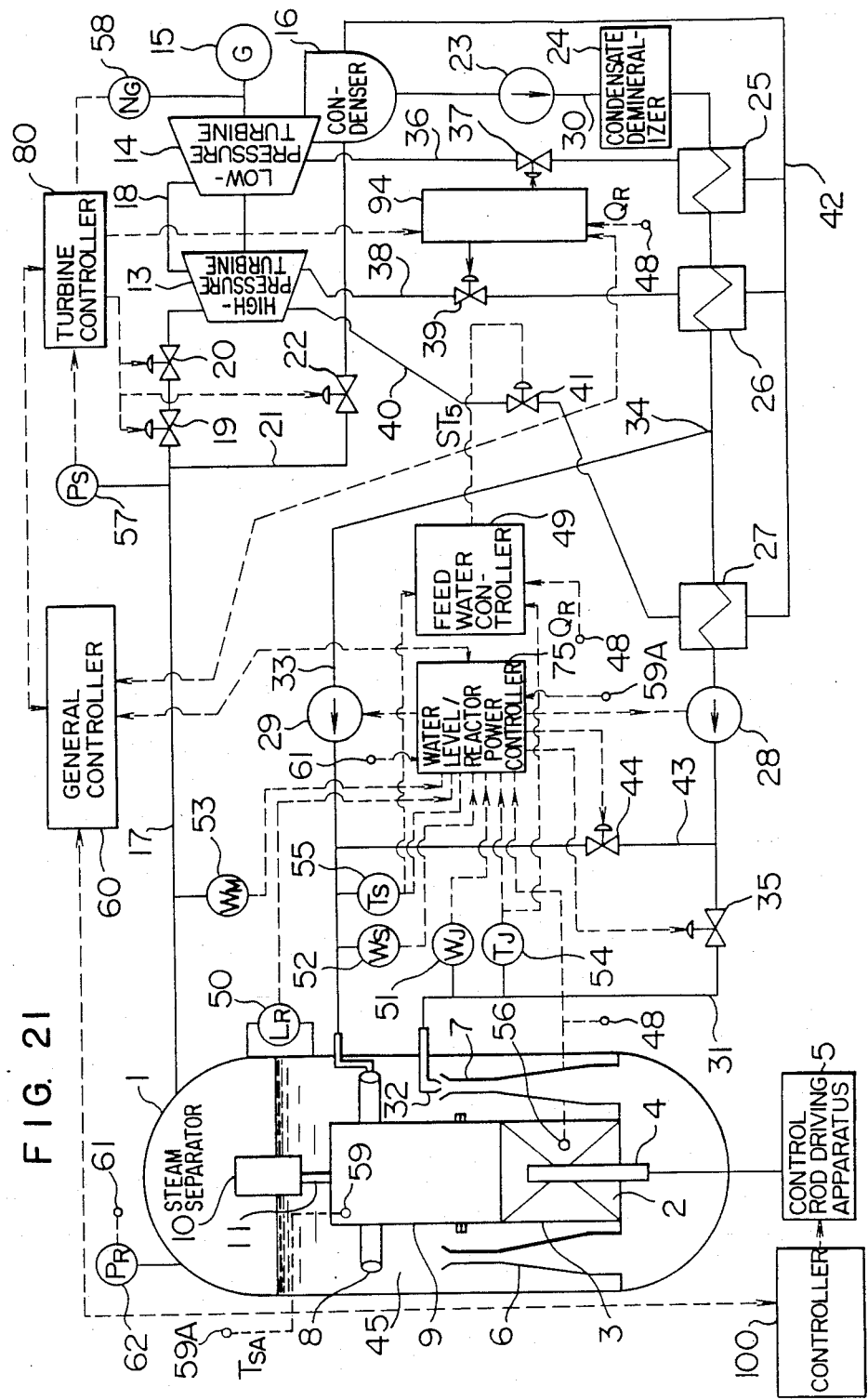
FIG. 21 is a schematic diagram of the BWR power plant in accordance with still another embodiment of the present invention.

A nuclear power plant in accordance with a further embodiment of the present invention will now be described with reference to FIG. 21. The same components and arrangements as those of the embodiment shown in FIG. 1 are denoted by the same reference numerals. This embodiment is provided with a feed water temperature controller 49, a water level/reactor power controller 75, and a bleeding valve controller 94 which substitute the feed water temperature controller 46, the water level/ reactor power controller 70, and the bleeding valve controller 90 in the embodiment shown in FIG. 1, and the signal selector 47 is eliminated. Furthermore, a thermometer 59 for measuring the temperature $T_{SA}$ of the cooling water (saturated water) is provided in the reactor pressure vessel 1 (e.g. in the riser portion). A pressure gauge 62 for measuring the reactor pressure $P_R$ is installed in the reactor pressure vessel 1. Measurement signals of the thermometer 59 and the pressure gauge 62 are input to the water level/reactor power controller 75.

Figure 22:
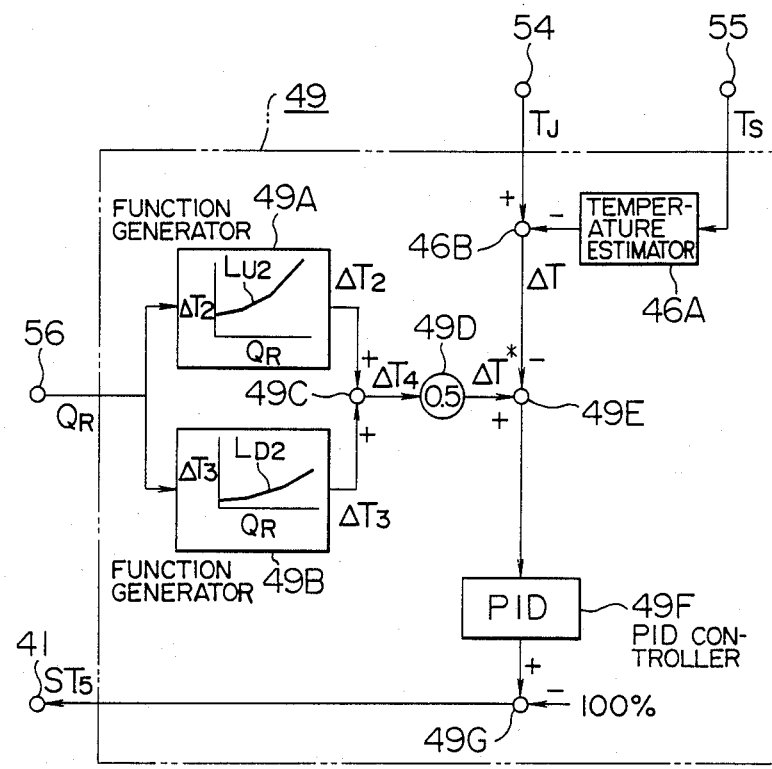
FIG. 22 is a schematic diagram of the feed water temperature controller shown in FIG. 21.

A description will now be made of the feed water temperature controller 49 with reference to FIG. 22. The feed water temperature controller 49 has a temperature estimator 46A, adders 46B, 49C, 49E, and 49G, function generators 49A, 49B, a targeted temperature difference setter 49D, and a PID controller 49F. The respective input terminals of the function generators 49A, 49B are connected to the output detector 56, while the respective output terminals thereof are connected to the adder 49C. The adder 49C is connected to the targeted temperature difference setter 49D. An input terminal of the adder 49E is connected to the targeted temperature difference setter 49D and the adder 46B, while an output terminal thereof is connected to the PID controller 49F. The PID controller 49F is connected to the bleeding valve 41 via the adder 49G. The function generator 49a stores characteristics $L_{U2}$ (corresponding to the characteristics of an alarm issuing line $L_{U2}$ stored in an operating status discriminator 76A shown in FIG. 24) indicating the relationships between the reactor power $Q_R$ and the temperature difference $\leftarrow T_2$. The function generator 49B stores characteristics $L_{D2}$ (corresponding to an alarm issuing line $L_{D2}$ which is stored in the operating status discriminator 76A and whose level is lower than that of the alarm issuing line $L_{U2}$). The area between the alarm issuing line $L_{U2}$ at the upper limit stored in the operation status discriminator 76A and the alarm issuing line $L_{D2}$ at the lower limit represents the operation allowed area.

The function generator 49A outputs the temperature difference $\Delta T_2$ corresponding to the reactor power $Q_R$ input. The function generator 49B outputs the temperature difference $\Delta T_3$ corresponding to the reactor power $Q_R$ input. The adder 49C adds the temperature differences $\Delta T_2$ and $\Delta T_3$ and outputs a temperature difference $\Delta T_4$ thus obtained. The targeted temperature difference setter 49D calculates a targeted temperature difference $\Delta T^*$ on the basis of the temperature difference $\Delta T_4$ input. In this embodiment, a temperature difference which is 0.5-fold the temperature difference $\Delta T_4$, i.e., an average value of the temperature differences $\Delta T_2$ and $\Delta T_3$, constitutes the targeted temperature difference $\Delta T^*$. The adder 49E calculates a deviation between the temperature difference $\Delta T$ obtained by the calculator 46B and the targeted temperature difference $\Delta T^*$. The PID controller 49F outputs a control signal on the basis of this deviation in such a manner that the temperature of the jet pump driving water becomes higher than that of the feed water sparger water by a predetermined temperature. The adder 49G outputs an opening-amount signal $ST_5$ on the basis of this control signal. The amount of opening of the bleeding valve 41 is controlled on the basis of the opening-amount signal $ST_5$.

In this embodiment since the feed water heater 27 and the feed water pipes 31, 33 are provided, it is possible to effect the above-described control mode of item (I) which allows a function similar to that of the embodiment shown in FIG. 1 to be obtained. The feed water temperature controller 49 controls the difference between the temperatures of the feed water flowing through the feed water pipe 31 and the feed water flowing through the feed water pipe 33 to a predetermined temperature.

Figure 23:
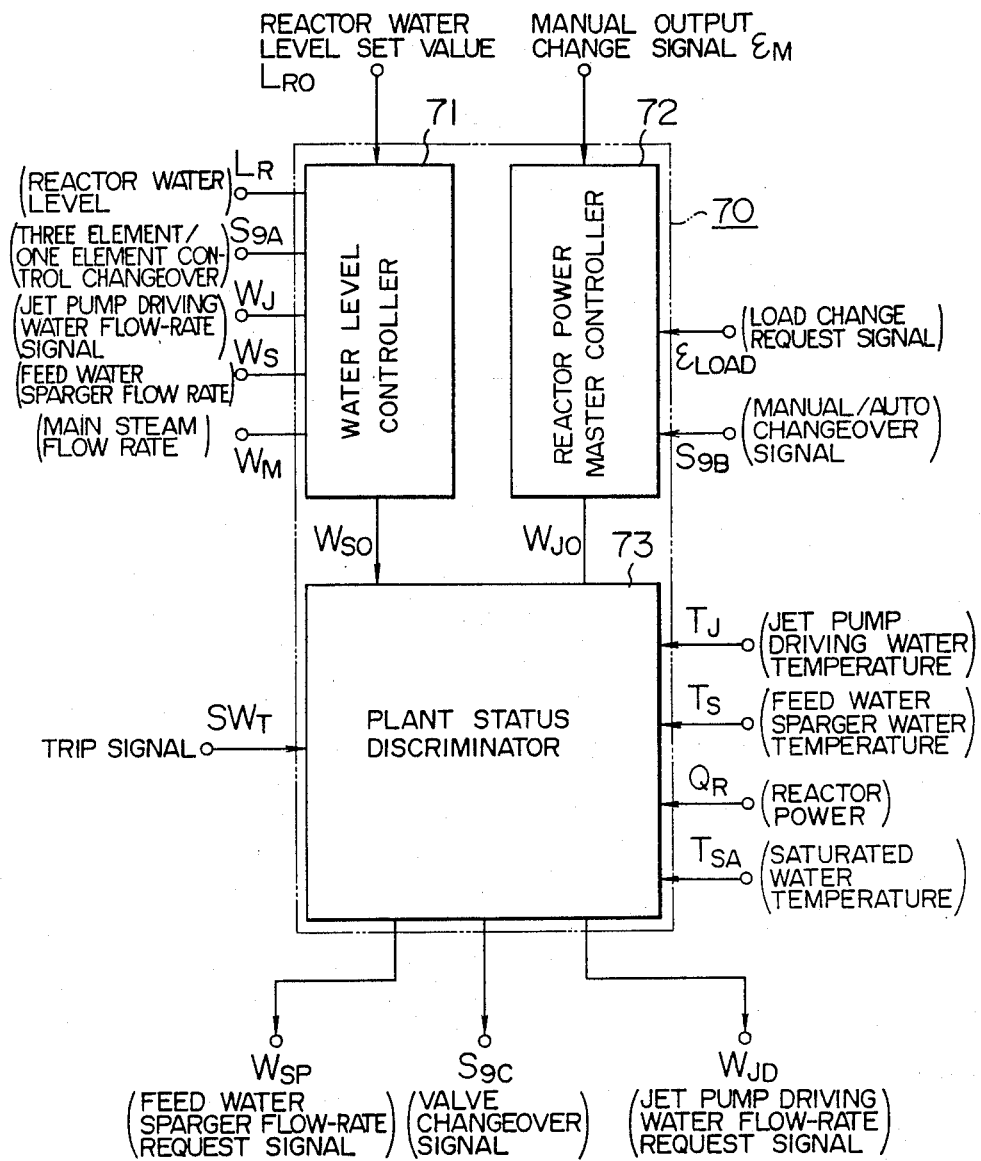
FIG. 23 is a schematic diagram of the water level/output controller shown in FIG. 21.

A description will now be made of the water level/reactor power controller 75 for carrying out the above-described control mode of item (II). FIG. 23 illustrates the arrangement of the water level/reactor power controller 75. This water level/reactor power controller 75 has the water level controller 71 and the reactor power master controller 72 both provided in the water level/reactor power controller 75. In addition to these, the water level/reactor power controller has a plant status discriminator 76. At the time of carrying out the control mode of item (II), the water level controller 71, the reactor power master controller 72, and the plant status discriminator 76 of the water level/ reactor power controller 75 operates in the same manner as that carried out by the water level controller 71, the reactor power master controller 72, and the plant status discriminator 73 of the water level/reactor power controller 75.

Figure 24:
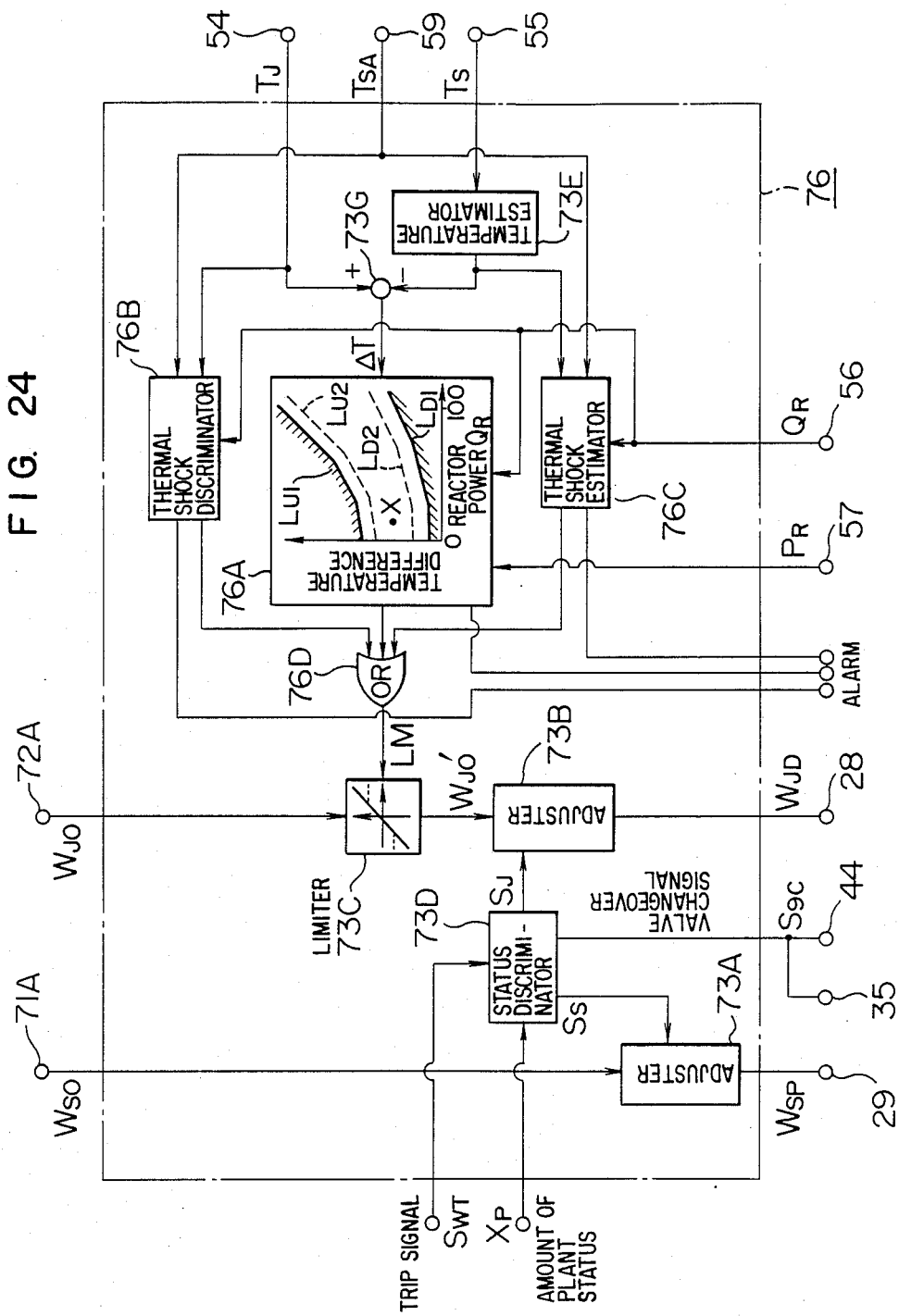
FIG. 24 is a schematic diagram of the plant status discriminator shown in FIG. 23.

In this embodiment, the plant status discriminator 76 is provided with the protective function performed by the plant status discriminator 73 in the control mode of item (III) in the embodiment shown in FIG. 1. A detailed arrangement of the plant status discriminator 76 is shown in FIG. 24. In the same way as the plant status discriminator 73, the plant status discriminator 76 has the flow-rate request signal adjusters 73A, 73B, the limiter 73C, the status discriminator 73D, the temperature estimator 73E, and the adder 73G. In addition to the foregoing arrangement, the plant status discriminator 76 has an operating status discriminator 76A, thermal shock discriminator 76B, 76C, and an OR circuit 76D. The thermal shock discriminator 76B is connected to the thermometers 54, 59 and the output detector 56. The thermal shock discriminator 76C is connected to the thermometers 55, 59 and the output detector 56. The respective output terminals of the operation status discriminator 76A and the thermal shock discriminators 76B, 76C are connected to the limiter 73C via the OR circuit 76D. Upon receiving the jet pump driving water temperature $T_J$ measured by the thermometer 54 and a saturated water temperature $T_{SA}$ measured by the thermometer 59, the thermal shock discriminator 76B effects discrimination in accordance with the following formula:

$$T_{SA}-T_J<\Delta T_J(Q_R) \tag{1}$$

The thermal shock discriminator 76B outputs "0" when Formula (1) is satisfied, and "1" when it is not satisfied. $\Delta T_J$ denotes an allowable maximum variation ratio of the jet pump driving water temperature which is capable preventing the occurrence of thermal shock and fatigue occurring as a result of supplying the jet pump driving water into the reactor pressure vessel 1, and is a function of the reactor power $Q_R$. Upon receiving the feed water sparger water temperature $T_S$ measured by the thermometer 55 and the saturated water temperature $T_{SA}$, the thermal shock discriminator 76C effects discrimination in accordance with the following formula:

$$T_{SA} - T_S < \Delta T_S(Q_R) \qquad (2)$$

The thermal shock discriminator 76C outputs "0" when Formula (2) is satisfied, and "1" when it is not satisfied. $\Delta T_S$ denotes an allowable maximum variation ratio of the feed water sparger water temperature which is capable of preventing the occurrence of thermal shock and fatigue occurring as a result of supplying the feed water sparger water into the reactor pressure vessel 1, and is a function of the reactor power $Q_R$.

The operation status discriminator 76A stores the respective characteristics of the alarm issuing line $L_{U2}$ indicating an upper limit of the temperature difference $\Delta T$ and the alarm issuing line $L_{D2}$ indicating a lower limit of the temperature difference $\Delta T$. The temperature difference $\Delta T$ determined by these alarm issuing lines $L_{U2}$, $L_{D2}$ is a function of the reactor output $Q_R$. The alarm issuing line $L_{U2}$ corresponds to the alarm issuing line $L_2$ shown in FIG. 10. The alarm issuing line $L_{D2}$ is set such as to be lower than the alarm issuing line $L_{U2}$ so as to prevent the occurrence of cavitation in the jet pumps 6. A line $L_{U1}$ shown in FIG. 24 corresponds to the line $L_1$ (FIG. 10). A line $L_{D1}$ which is set below the alarm issuing line $L_{D2}$ and indicates a temperature difference at a lower limit at which the cavitation does not occur in the jet pumps 6. The area above the line $L_{U1}$ and the area below the line $L_{D1}$ are the reactor operation prohibited areas. The area between the alarm issuing lines $L_{U2}$ and $L_{D2}$ is the operation allowed area. Upon receiving the temperature difference $\Delta T$ output from the adder 73G, the operation status discriminator 76A determines whether or not the temperature difference $\Delta T$ is present in the area between the alarm issuing lines $L_{U2}$ and $L_{D2}$ by reflecting the reactor power $Q_R$. When YES is the answer, the operation status discriminator 76A outputs "0", and when NO is the answer, it outputs "1".

Upon receiving the outputs of the thermal shock discriminators 76B, 76C and the operation status discriminator 76A, the OR circuit outputs the discrimination result signal LM of "1" or "0" to the limiter 73C.

The protective function of the plant status discriminator 76 described above is the function of the second protecting section shown in the control mode in item (III) in the embodiment shown in FIG. 1. The function of the first protecting section in the plant status discriminator 76 in accordance with this embodiment can be attained by the flow-rate request signal adjusters 73A, 73B, the limiter 73C, and the status discriminator 73D, in the same way as the first protecting section in the embodiment shown in FIG. 1. The first and second protecting sections of the plant status discriminator 76 produce the same effect as that obtained by the first and second protecting sections of the plant status discriminator 73. Furthermore, since this embodiment is provided with the thermal shock discriminators 76B, 76C, it is possible to prevent the thermal shock and fatigue based on changes in the feed water temperatures. In addition, since the operation status discriminator 76A determines whether the temperature difference $\Delta T$ is in the area above the alarm issuing line $L_{D2}$ or in the area therebelow, and the limiter 73C is operated by the discrimination result signal LM based on this judgement, it is possible to prevent the occurrence of the cavitation in the jet pumps.

Figure 25:
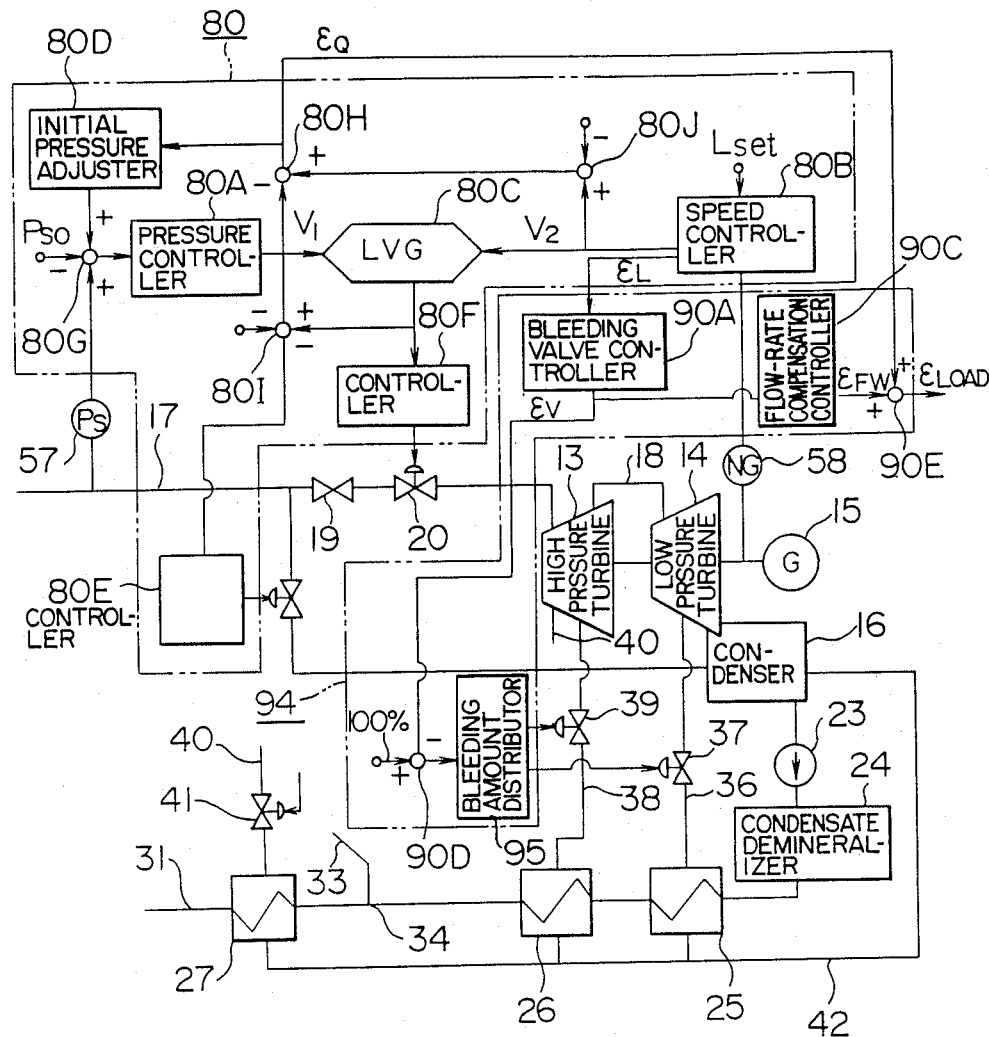
FIG. 25 is a schematic diagram of the bleeding valve controller shown in FIG. 21.
Figure 26:
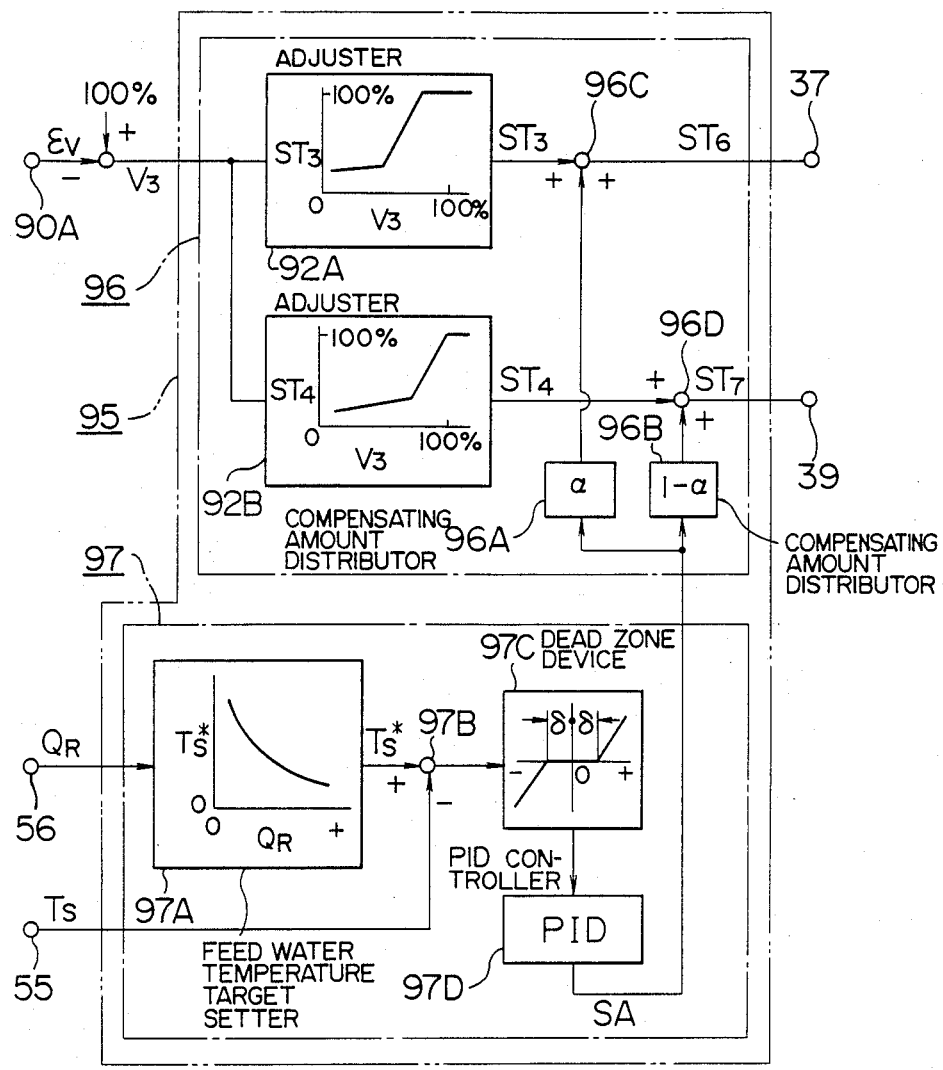
FIG. 26 is a schematic diagram of the bleeding amount distributor shown in FIG. 25.

The control mode of item (IV) carried out in the embodiment shown in FIG. 1 is performed by the bleeding valve controller 94 in this embodiment. As shown in FIG. 25, the bleeding valve controller 94 has the bleeding valve controller 90A, the jet pump driving water flow-rate compensation controller 90C, the adders 90D, 90E, and a bleeding amount distributor 95. The arrangements other than that of the bleeding amount distributor 95 are the same as those provided in the bleeding valve controller 90. The bleeding valve distributor 95 has a bleeding valve controller 96 and a bleeding valve opening-amount compensator 97, as shown in FIG. 26. The bleeding valve controller 96 has adjusters 92A, 92B, compensating amount distributors 96A, 96B, and adders 96C, 96D. An input terminal of the adder 96C is connected to the adjuster 92A and the compensating amount distributor 96A, while an output terminal thereof is connected to the bleeding valve 37. An input terminal of the adder 96D is connected to the adjuster 92B and the compensating amount distributors 96B, while an output terminal thereof is connected to the bleeding valve 39. The bleeding valve opening-amount compensator 97 has a feed water temperature target setter 97A to which the reactor power $Q_R$ is input, an adder 97B connected to the feed water temperature target setter 97A and the thermometer 55, a dead zone device 97C connected to the adder 97B, and a PID controller 97D connected to the dead zone device 97C and adapted to perform a proportional and integral operation. An output terminal of the PID controller 97D is connected to the compensating amount distributors 96A, 96B.

The feed water temperature target setter 97A determines a targeted control value $T_S^*$ of the feed water sparger water temperature $T_S$ on the basis of the reactor power $Q_R$ input. The adder 97B calculates a deviation $(T_S - T_S^*)$ between the feed water sparger water temperature $T_S$ and the targeted control value $T_S^*$. The dead zone device 97 has dead zones with an amplitude of $\delta$ on the +side and the —side symmetrically about a zero line, and output a positive value when the deviation $(T_S - T_S^*)$ has become grater than $\delta$ and a negative signal when it has become smaller than $-\delta$. The PID controller 97D outputs a compensation signal SA on the basis of an output signal of the dead zone device 97C. The compensation signal SA is input to the compensating amount distributors 96A, 96B. The adjusters 92A, 92B output the opening-amount signals $ST_3$, $ST_4$ on the basis of the deviation signal $V_3$, as described above. The compensating amount distributor 96A calculates $\alpha.SA$, where $\alpha$ is a coefficient of distribution and assumes a value given by $0 \leq \alpha < 1$. The compensating amount distributor 96B calculates $(1-\alpha).SA$. The adder 96C adds $\alpha.SA$ output from the compensating amount distributor 96A to the opening-amount signal $ST_3$ to obtain an opening-amount signal $ST_6$, and outputs this signal $ST_6$ to the bleeding valve 37. The amount of opening of the bleeding valve 37 is adjusted to an amount corresponding to the opening-amount signal $ST_6$. The adder 96D adds $(1-\alpha).SA$ output from the compensating amount distributor 96B to the opening-amount signal $ST_3$ to obtain an opening-amount signal $ST_7$, and outputs this opening-amount signal $ST_7$ to the bleeding valve 37. An amount of opening of the bleeding valve 37 is adjusted to an amount corresponding to the opening-amount signal $ST_7$. The bleeding valves 37, 39 thus controlled operate on the basis of both a component of relatively slow variation which is included in the load change request signal $\epsilon_L$ and a component of variation with small amplitude and a short period which is included in the load change request signal $\epsilon_L$.

In this embodiment, it is possible to obtain an effect similar to that obtained in the control mode of item (IV) of the embodiment shown in FIG. 1. Since this embodiment is provided with the bleeding valve opening-amount compensator 97, the accuracy of controlling the amounts of opening of the bleeding valves 37, 39 improves as compared with those of the embodiment shown in FIG. 1.

Figure 16:
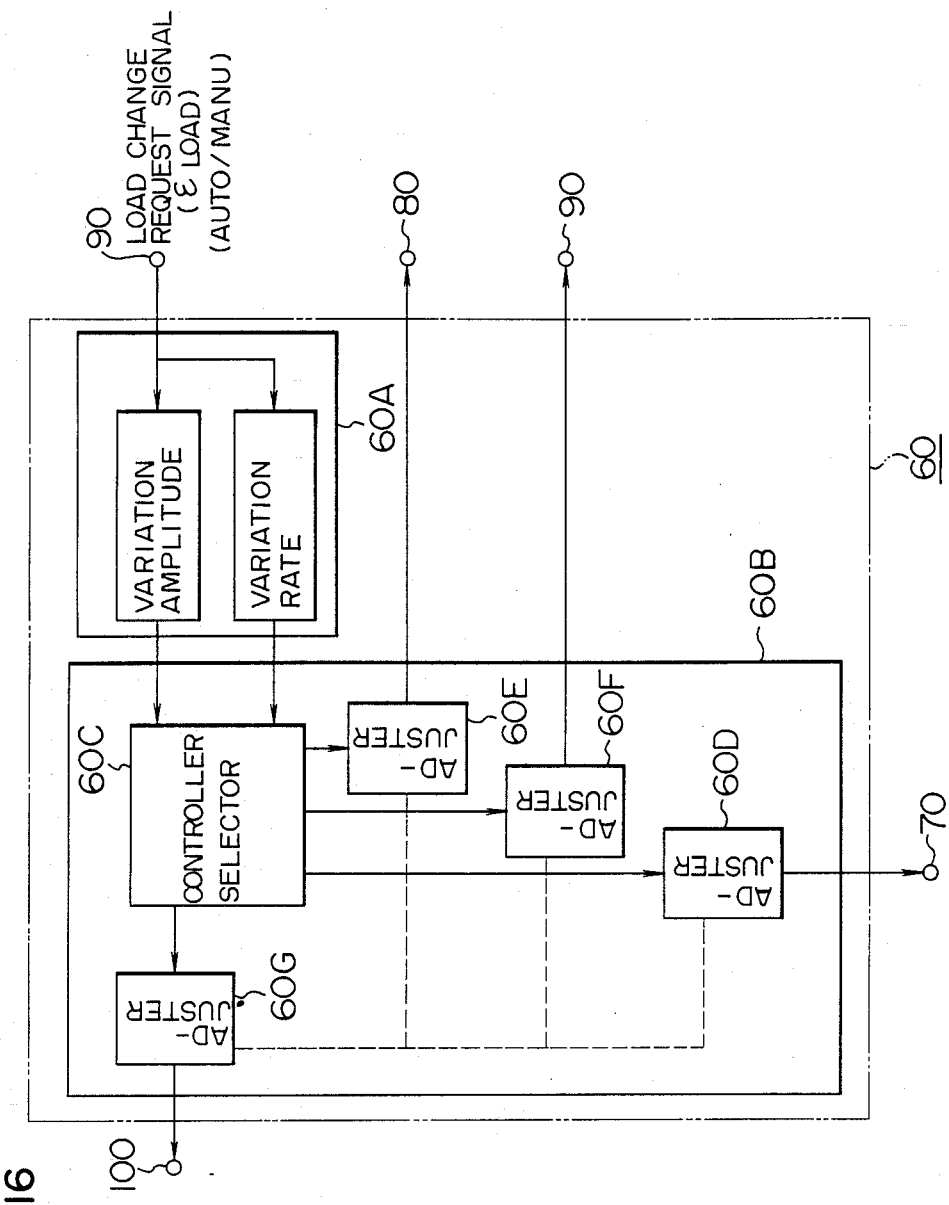
FIG. 16 is a detailed schematic diagram of a general controller shown in FIG. 1.

This embodiment is also provided with the general controller 60 having the same function as that of the embodiment shown in FIG. 1. Accordingly, the effect brought about by the general controller 60 shown in FIG. 16 can also be obtained in this embodiment.

What is claimed is:

1. A nuclear power plant comprising:
   a reactor container incorporating a core;
   a jet pump disposed in said reactor container and adapted to supply a coolant to said core;
   a feed water sparger provided in said reactor container; and
   feed water supplying means for introducing a portion of feed water into said jet pump as driving water and introducing the remaining portion of said feed water into said feed water sparger at a temperature lower than that of said portion of said feed water introduced into said jet pump.

2. A nuclear power plant according to claim 1, further comprising controlling means for controlling a temperature difference between said feed water introduced into said jet pump as said driving water and said feed water introduced into said feed water sparger.

3. A nuclear power plant according to claim 1, further comprising a baffle cylinder which is disposed inside said feed water sparger, extends to the side of said jet pump, and is adapted to restrain the mixing of a high-temperature coolant delivered from said core and said feed water delivered from said feed water sparger.

4. A nuclear power plant according to claim 3, wherein a lower end of said baffle cylinder is located in the vicinity of an upper end of said jet pump.

5. A nuclear power plant comprising:
   a reactor container incorporating a core;
   a jet pump disposed in said reactor container and adapted to supply a coolant to said core;
   a feed water sparger provided in said reactor container;
   a first pipeline for introducing a portion of feed water into said jet pump as driving water;
   a second pipeline for introducing the remaining portion of said feed water into said feed water sparger; and
   heating means disposed in said first pipeline and adapted to increase the temperature of said feed water introduced into said jet pump to a level higher than that of said feed water introduced into said feed water sparger.

6. A nuclear power plant according to claim 5, further comprising means for controlling an amount of heating by said heating means.

7. A nuclear power plant according to claim 5, further comprising means for introducing steam generated in said reactor into said heating means as a heating medium.

8. A nuclear power plant comprising:
   a reactor container incorporating a core;
   a jet pump disposed in said reactor container and adapted to supply a coolant to said core;
   a feed water sparger provided in said reactor container;
   a first pipeline for introducing a portion of feed water into said jet pump as driving water;
   a second pipeline connected to said first pipeline and adapted to introduce said feed water into said feed water sparger; and
   a feed water heater disposed in said first pipeline and adapted to increase the temperature of said feed water introduced into said jet pump to a level higher than that of said feed water introduced into said feed water sparger, said second pipeline being installed in said first pipeline upstream of said feed water heater.

9. A nuclear power plant according to claim 8, further comprising a feed water heater communicated with a connecting portion between said first pipeline and said second pipeline and located upstream of said connecting portion.

10. A nuclear power plant according to claim 8, further comprising means for controlling a temperature difference between said feed water delivered from said feed water heater and said feed water flowing through said second pipeline.

11. A nuclear power plant according to claim 10, wherein said control means is means for controlling an amount of a heating medium supplied to said feed water heater.

12. A nuclear power plant comprising:
   a first pipeline for introducing as driving water portion of feed water into a jet pump disposed in a reactor container and adapted to supply a coolant to a core;
   a second pipeline for introducing the remaining portion of said feed water into said feed water sparger;
   heating means disposed in said first pipeline and adapted to increase the temperature of said feed water introduced into said jet pump to a level higher than that of said feed water introduced into said feed water sparger;
   a first flow meter for measuring a flow rate of steam discharged from said reactor container;
   a second flow meter for measuring a flow rate of said feed water introduced through said first pipeline;
   a third flow meter for measuring a flow rate of said feed water introduced through said second pipeline;
   a level gauge for measuring the level of said coolant in said reactor container;
   water level controlling means for outputting a control signal so as to maintain a water level in said reactor container at a predetermined level on the basis of said flow rate of steam measured by said first flow meter, each of said flow rates of feed water measured by said second and third flow meters, and said water level measured by said level meter; and
   flow-rate adjusting means disposed in said second pipeline and adapted to adjust a flow rate of said feed water flowing through said second pipeline on the basis of said control signal.

13. A nuclear power plant comprising:
a first pipeline for introducing as driving water a portion of feed water into a jet pump disposed in a reactor container and adapted to supply a coolant to a core;
a second pipeline for introducing the remaining portion of said feed water into said feed water sparger;
heating means disposed in said first pipeline and adapted to increase the temperature of said feed water introduced into said jet pump to a level higher than that of said feed water introduced into said feed water sparger;
reactor power controlling means for outputting a control signal for controlling a reactor power; and
flow rate adjusting means disposed in said first pipeline and adapted to adjust a flow rate of said feed water in said first pipeline on the basis of said control signal.

14. A nuclear power plant comprising:
a first pipeline for introducing as driving water a portion of feed water into a jet pump disposed in a reactor container and adapted to supply a coolant to a core;
a second pipeline for introducing the remaining portion of said feed water into said feed water sparger;
heating means disposed in said first pipeline and adapted to increase the temperature of said feed water introduced into said jet pump to a level higher than that of said feed water introduced into said feed water sparger;
reactor power controlling means for outputting a first control signal to control a reactor power;
water level controlling means for outputting a second control signal to maintain the water level in said reactor container at a predetermined level;
first flow-rate adjusting means provided in said first pipeline and adapted to adjust a flow rate of said feed water in said first pipeline on the basis of said first control signal;
second flow-rate adjusting means provided in said second pipeline adapted to adjust a flow rate of said feed water in said second pipeline on the basis of said second control signal; and
means for correcting at least one of said first and second control signals when a trip signal is input.

15. A nuclear power plant comprising:
a first pipeline for introducing as driving water a portion of feed water into a jet pump disposed in a reactor container and adapted to supply a coolant to a core;
a second pipeline for introducing the remaining portion of said feed water into said feed water sparger;
heating means disposed in said first pipeline and adapted to increase the temperature of said feed water introduced into said jet pump to a level higher than that of said feed water introduced into said feed water sparger;
a first thermometer disposed in said first pipeline;
a second thermometer disposed in said second pipeline;
a reactor power detector provided in said core; and
means for determining on the basis of each of said feed water temperatures measured by said first and second thermometers and a reactor power measured by said reactor power detector whether or not an operating status of said reactor has reached an allowable limit, and for correcting said control signal in such a manner that said operating status does not exceed said allowable limit when said operating status has reached said allowable limit.

16. A nuclear power plant comprising:
a reactor container incorporating a core;
a jet pump disposed in said reactor container and adapted to supply a coolant to said core;
a feed water sparger ]provided in said reactor container;
a first pipeline for introducing feed water into said jet pump as driving water;
a second pipeline connected to said first pipeline and adapted to introduce said feed water into said feed water sparger;
a first feed water heater disposed at a portion of said first pipeline upstream of a connecting point between said first pipeline and said second pipeline;
a second feed water heater disposed at a portion of said first pipeline downstream of said connecting point;
a turbine driven by steam discharged from said reactor container;
a bleeding pipeline provided with a flow-rate adjusting valve and adapted to introduce said steam into said first feed water heater;
means for detecting a rotational speed of said turbine;
means for extracting from an output of said rotational speed detecting means a component of variation falling within a predetermined period and predetermined amplitude; and
means for controlling an amount of opening of said flow-rate adjusting valve on the basis of said component of variation extracted.

17. A nuclear power plant according to claim 16, characterised by further comprising another bleeding pipeline provided with another flow-rate adjusting valve and adapted to introduce said steam into said second feed water heater, first temperature detecting means disposed in said first pipeline, second temperature detecting means disposed in said second pipeline, and means for controlling an amount of opening of said other flow-rate adjusting valve on the basis of a difference between the feed water temperature measured by said first temperature detecting means and the feed water temperature measured by said second temperature detecting means.

* * * * *